(12) United States Patent
Nielsen et al.

(10) Patent No.: US 10,088,549 B2
(45) Date of Patent: *Oct. 2, 2018

(54) SYSTEM AND A METHOD FOR TRACKING MOBILE OBJECTS USING CAMERAS AND TAG DEVICES

(71) Applicant: Appropolis Inc., Calgary (CA)

(72) Inventors: Jorgen Staal Nielsen, Calgary (CA); Phillip Richard Gee, Calgary (CA)

(73) Assignee: Appropolis Inc., Calgary, Alberta ( * ) Notice: Subject to any disclaimer, the term of this patent is extended or adjusted under 35 U.S.C. 154(b) by 405 days.

This patent is subject to a terminal disclaimer.

(21) Appl. No.: 14/866,499

(22) Filed: Sep. 25, 2015

(65) Prior Publication Data

US 2016/0377698 A1    Dec. 29, 2016

Related U.S. Application Data

(60) Provisional application No. 62/184,726, filed on Jun. 25, 2015.

(51) Int. Cl.
| | |
|---|---|
| *G01S 3/02* | (2006.01) |
| *G01S 5/02* | (2010.01) |
| *G01S 5/16* | (2006.01) |
| *G06T 7/277* | (2017.01) |
| *G06T 7/292* | (2017.01) |
| *G01S 19/48* | (2010.01) |

(52) U.S. Cl.
CPC ............ *G01S 5/0263* (2013.01); *G01S 5/16* (2013.01); *G06T 7/277* (2017.01); *G06T 7/292* (2017.01); *G01S 5/0294* (2013.01); *G01S 19/48* (2013.01); *G06T 2207/30232* (2013.01)

(58) Field of Classification Search
CPC ........ G01S 5/0263; G01S 5/0294; G01S 5/16; G06T 7/292; G06T 7/277
USPC ........ 342/450, 451, 357.65; 340/13.26, 572.1
See application file for complete search history.

(56) References Cited

U.S. PATENT DOCUMENTS

| | | | | |
|---|---|---|---|---|
| 6,064,749 | A  * | 5/2000 | Hirota ..................... | G06F 3/011 345/7 |
| 6,359,647 | B1 * | 3/2002 | Sengupta ......... | G08B 13/19608 348/154 |
| 7,151,454 | B2 * | 12/2006 | Washington ....... | G06K 7/10079 340/572.1 |
| 8,542,276 | B2 * | 9/2013 | Huang ............... | G06K 9/00771 348/143 |

(Continued)

OTHER PUBLICATIONS

WIPO—International Preliminary Report on Patentability dated Jan. 4, 2018—PCT/CA2016/050744 filed Jun. 23, 2016.

*Primary Examiner* — Chuong P Nguyen
(74) *Attorney, Agent, or Firm* — Daniel R. Polonenko

(57) ABSTRACT

A method and system for tracking mobile objects in a site are disclosed. The system comprises a computer cloud communicating with one or more imaging devices and one or more tag devices. Each tag device is attached to a mobile object, and has one or more sensors for sensing the motion of the mobile object. The computer cloud visually tracks mobile objects in the site using image streams captured by the imaging devices, and uses measurements obtained from tag devices to resolve ambiguity occurred in mobile object tracking. The computer cloud uses an optimization method to reduce power consumption of tag devices.

30 Claims, 20 Drawing Sheets

(56) References Cited

U.S. PATENT DOCUMENTS

| | | | | |
|---|---|---|---|---|
| 8,825,229 B2* | 9/2014 | Alnafisah | ............... | A61D 7/00 |
| | | | | 244/3.11 |
| 9,195,898 B2* | 11/2015 | Huang | ............. | G06F 17/30247 |
| 9,904,852 B2* | 2/2018 | Divakaran | ......... | G06K 9/00771 |
| 2006/0028552 A1* | 2/2006 | Aggarwal | ............ | G01S 3/7864 |
| | | | | 348/169 |
| 2006/0061481 A1* | 3/2006 | Kurple | ..................... | B60P 1/48 |
| | | | | 340/686.1 |
| 2009/0268033 A1* | 10/2009 | Ukita | .................... | H04N 7/181 |
| | | | | 348/169 |
| 2014/0152855 A1* | 6/2014 | Boncyk, V | ....... | G06F 17/30259 |
| | | | | 348/207.1 |
| 2015/0149250 A1* | 5/2015 | Fein | ................. | G06K 7/10306 |
| | | | | 705/7.31 |
| 2016/0379074 A1* | 12/2016 | Nielsen | ............... | G06K 9/3241 |
| | | | | 348/143 |

* cited by examiner

1

SYSTEM AND A METHOD FOR TRACKING MOBILE OBJECTS USING CAMERAS AND TAG DEVICES

FIELD OF THE DISCLOSURE

The present invention relates generally to a system and a method for tracking mobile objects, and in particular, a system and a method for tracking mobile objects using cameras and tag devices.

BACKGROUND

Outdoor mobile object tracking such as the Global Positioning System (GPS) is known. In the GPS system of the U.S.A. or similar systems such as the GLONASS system of Russia, the Doppler Orbitography and Radio-positioning Integrated by Satellite (DORIS) of France, the Galileo system of the European Union and the BeiDou system of China, a plurality of satellites on earth orbits communicate with a mobile device in an outdoor environment to determine the location thereof. However, a drawback of these systems is that the satellite communication generally requires line-of-sight communication between the satellites and the mobile device, and thus they are generally unusable in indoor environments, except in restricted areas adjacent to windows and open doors.

Some indoor mobile object tracking methods and systems are also known. For example, in the Bluetooth® Low Energy (BLE) technology, such as the iBeacon™ technology specified by Apple Inc. of Cupertino, Calif., U.S.A. or Samsung's Proximity™, a plurality of BLE access points are deployed in a site and communicate with nearby mobile BLE devices such as smartphones for locating the mobile BLE devices using triangulation. Also indoor WiFi signals are becoming ubiquitous and commonly used for object tracking based on radio signal strength (RSS) observables. However, the mobile object tracking accuracy of these systems is still to be improved. Moreover, these systems can only track the location of a mobile object, and other information such as gestures of a person being tracked cannot be determined by these systems.

It is therefore an object to provide a novel mobile object tracking system and method with higher accuracy, robustness and that provides more information about the mobile objects being tracked.

SUMMARY

There are a plethora of applications that desire extension of the location of a mobile device or a person in an indoor environment or in a dense urban outdoor environment. According to one aspect of this disclosure, an object tracking system and a method is disclosed for tracking mobile objects in a site, such as a campus, a building, a shopping center or the like.

Herein, mobile objects are moveable objects in the site, such as human being, animals, carts, wheelchairs, robots and the like, and may be moving or stationary from time to time, usually in a random fashion from a statistic point of view.

According to another aspect of this disclosure, visual tracking in combination of tag devices are used for tracking mobile objects in the site. One or more imaging devices such as one or more cameras, are used for intermittently or continuously, visually tracking the locations of one or more mobile objects using suitable image processing technologies. One or more tag devices attached to mobile objects may also be used for refining object tracking and for resolving ambiguity occurred in visual tracking of mobile objects.

As will be described in more detail later, herein, ambiguity occurred in visual object tracking includes a variety of situations that cause visual object tracking less reliable or even unreliable.

Each tag device is a uniquely identifiable, small electronic device attached to a mobile object of interest and moving therewith, undergoing the same physical motion. However, some mobile objects may not have any tag device attached thereto.

Each tag device comprises one or more sensors, and is battery powered and operable for an extended period of time, e.g., several weeks, between battery charges or replacements. The tag devices communicate with one or more processing structures, such as one or more processing structures of one or more server computers, e.g., a so-called computer cloud, using suitable wireless communication methods. Upon receiving a request signal from the computer cloud, a tag device uses its sensors to make measurements or observations of the mobile object associated therewith, and transmits these measurements wirelessly to the system. For example, a tag device may make measurements of the characteristics of the physical motion of itself. As the tag devices undergo the same physical motion as the associated mobile object, the measurements made by the tag devices represent the motion measurements of their associated mobile objects.

According to another aspect of this disclosure, the object tracking system comprises a computer cloud having one or more servers, communicating with one or more imaging devices deployed in a site for visually detecting and tracking moving and stationary mobile objects in the site.

The computer cloud accesses suitable image processing technologies to detect foreground objects, denoted as foreground feature clusters (FFCs), from images or image frames captured by the imaging devices, each FFC representing a candidate mobile object in the field of view (FOV) of the imaging device. The computer cloud then identifies and tracks the FFCs.

When ambiguity occurs in identifying and tracking FFCs, the computer cloud requests one or more candidate tag devices to make necessary tag measurements. The computer cloud uses tag measurements to resolve any ambiguity and associates FFCs with tag devices for tracking.

According to another aspect of this disclosure, when associating FFCs with tag devices, the computer cloud calculates a FFC-tag association probability, indicating the correctness, reliability or belief in the determined association. In this embodiment, the FFC-tag association probability is numerically calculated, e.g., by using a suitable numerical method to find a numerical approximation of the FFC-tag association probability. The FFC-tag association probability is constantly updated as new images and/or tag measurements are made available to the system. The computer cloud attempts to maintain the FFC-tag association probability at or above a predefined probability threshold. If the FFC-tag association probability falls below the probability threshold, more tag measurements are requested. The tag devices, upon request, make the requested measurements and send the requested measurements to the computer cloud for establishing the FFC-tag association.

Like any other systems, the system disclosed herein operates with constraints such as power consumption. Generally, the overall power consumption of the system comprises the power consumption of the tag devices in making tag measurements and the power consumed by other components of the system including the computer cloud and the imaging devices. While the computer cloud and the imaging devices are usually powered by relatively unlimited sources of power, tag devices are usually powered by batteries having limited stored energy. Therefore, it is desirable, although optional in some embodiments, to manage power consumption of tag devices during mobile object tracking through using low power consumption components known in the art, and by only triggering tag devices to conduct measurements when actually needed.

Therefore, according to another aspect of this disclosure, at least in some embodiments, the system is designed using a constrained optimization algorithm with an objective of minimizing tag device energy consumption for a constraint of the probability of correctly associating the tag device with an FFC. The system achieves this objective by requesting tag measurements only when necessary, and by determining the candidate tag devices for providing the required tag measurements.

When requesting tag measurements, the computer cloud first determines a group of candidate tag devices based on the analysis of captured images and determines required tag measurements based on the analysis of captured images and the knowledge of power consumption for making the tag measurements. The computer cloud then only requests the required tag measurements from the candidate tag devices.

One objective of the object tracking system is to visually track mobile objects and using measurements from tag devices attached to mobile objects to resolve ambiguity occurred in visual object tracking. The system tracks the locations of mobile objects having tag devices attached thereto, and optionally and if possible, tracks mobile objects having no tag devices attached thereto. The object tracking system is the combination of:

1) Computer vision processing to visually track the mobile objects as they move throughout the site;

2) Wireless messaging between the tag device and the computer cloud to establish the unique identity of each tag device; herein, wireless messaging refers to any suitable wireless messaging means such as messaging via electromagnetic wave, optical means, acoustic telemetry, and the like;

3) Motion related observations or measurements registered by various sensors in tag devices, communicated wirelessly to the computer cloud; and 4) Cloud or network based processing to correlate the measurements of motion and actions of the tag devices and the computer vision based motion estimation and characterization of mobile objects such that the association of the tag devices and the mobile objects observed by the imaging devices can be quantified through a computed probability of such association.

The object tracking system combines the tracking ability of imaging devices with that of tag devices for associating a unique identity to the mobile object being tracked. Thereby the system can also distinguish between objects that appear similar, being differentiated by the tag. In another aspect, if some tag devices are associated with the identities of the mobile objects they attached to, the object tracking system can further identify the identities of the mobile objects and track them.

In contradistinction, known visual object tracking technologies using imaging devices can associate a unique identity to the mobile object being tracked only if the image of the mobile object has at least one unique visual feature such as an identification mark, e.g., an artificial mark or a biometrical mark, e.g., a face feature, which may be identified by computer vision processing methods such as face recognition. Such detailed visual identity recognition is not always available or economically feasible.

According to one aspect of this disclosure, there is provided a system for tracking at least one mobile object in a site. The system comprises: one or more imaging devices capturing images of at least a portion of the site; and one or more tag devices, each of the one or more tag devices being associated with one of the at least one mobile object and moveable therewith, each of the one or more tag devices obtaining one or more tag measurements related to the mobile object associated therewith; and at least one processing structure combining the captured images with at least one of the one or more tag measurements for tracking the at least one mobile object.

In some embodiments, each of the one or more tag devices comprises one or more sensors for obtaining the one or more tag measurements.

In some embodiments, the one or more sensors comprise at least one of an Inertial Measurement Unit (IMU), a barometer, a thermometer, a magnetometer, a global navigation satellite system (GNSS) sensor, an audio frequency microphone, a light sensor, a camera, and a receiver signal strength (RSS) measurement sensor.

In some embodiments, the RSS measurement sensor is a sensor for measuring the signal strength of a received wireless signal received from a transmitter, for estimating the distance from the transmitter.

In some embodiments, the wireless signal is at least one of a Bluetooth signal and a WiFi signal.

In some embodiments, the at least one processing structure analyzes images captured by the one or more imaging devices for determining a set of candidate tag devices for providing said at least one of the one or more tag measurements.

In some embodiments, the at least one processing structure analyzes images captured by the one or more imaging devices for selecting said at least one of the one or more tag measurements.

In some embodiments, each of the tag devices provides the at least one of the one or more tag measurements to the at least one processing structure only when said tag device receives from the at least one processing structure a request for providing the at least one of the one or more tag measurements.

In some embodiments, each of the tag devices, when receiving from the at least one processing structure a request for providing the at least one of the one or more tag measurements, only provides the requested the at least one of the one or more tag measurements to the at least one processing structure.

In some embodiments, the at least one processing structure identifies from the captured images one or more foreground feature clusters (FFCs) for tracking the at least one mobile object.

In some embodiments, the at least one processing structure determines a bounding box for each FFC.

In some embodiments, the at least one processing structure determines a tracking point for each FFC.

In some embodiments, for each FFC, the at least one processing structure determines a bounding box and a tracking point therefor, said tracking point being at a bottom edge of the bounding box.

In some embodiments, at least one processing structure associates each tag device with one of the FFCs.

In some embodiments, when associating a tag device with a FFC, the at least one processing structure calculates an FFC-tag association probability indicating the reliability of the association between the tag device and the FFC.

In some embodiments, said FFC-tag association probability is calculated based on a set of consecutively captured images.

In some embodiments, said FFC-tag association probability is calculated by finding a numerical approximation thereof.

In some embodiments, when associating a tag device with a FFC, the at least one processing structure executes a constrained optimization algorithm for minimizing the energy consumption of the one or more tag devices while maintaining the FFC-tag association probability above a target value.

In some embodiments, when associating a tag device with a FFC, the at least one processing structure calculates a tag-image correlation between the tag measurements and the analysis results of the captured images.

In some embodiments, when the tag measurements for calculating said tag-image correlation comprise measurement obtained from an IMU.

In some embodiments, when the tag measurements for calculating said tag-image correlation comprise measurement obtained from at least one of an accelerometer, a gyroscope and a magnetometer for calculating a correlation between the tag measurements and the analysis results of the captured images to determine whether a mobile object is changing its moving direction.

In some embodiments, the at least one processing structure maintains a background image for each of the one or more imaging devices.

In some embodiments, when detecting FFCs from each of the captured images, the at least one processing structure generates a difference image by calculating the difference between the captured image and the corresponding background image, and detects one or more FFCs from the difference image.

In some embodiments, when detecting one or more FFCs from the difference image, the at least one processing structure mitigates shadow from each of the one or more FFCs.

In some embodiments, after detecting the one or more FFCs, the at least one processing structure determines the location of each of the one or more FFCs in the captured image, and maps each of the one or more FFCs to a three-dimensional (3D) coordinate system of the site by using perspective mapping.

In some embodiments, the at least one processing structure stores a 3D map of the site for mapping each of the one or more FFCs to the 3D coordinate system of the site, and wherein in said map, the site includes one or more areas, and each of the one or more areas has a horizontal, planar floor.

In some embodiments, the at least one processing structure tracks at least one of the one or more FFCs based on the velocity thereof determined from the captured images.

In some embodiments, each FFC corresponds to a mobile object, and wherein the at least one processing structure tracks the FFCs using a first order Markov process.

In some embodiments, the at least one processing structure tracks the FFCs using a Kalman filter with a first order Markov Gaussian process.

In some embodiments, when tracking each of the FFCs, the at least one processing structure uses the coordinates of the corresponding mobile object in a 3D coordinate system of the site as state variables, and the coordinates of the FFC in a two dimensional (2D) coordinate system of the captured images as observations for the state variables, and wherein the at least one processing structure maps the coordinates of the corresponding mobile object in a 3D coordinate system of the site to the 2D coordinate system of the captured images.

In some embodiments, the at least one processing structure discretizes at least a portion of the site into a plurality of grid points, and wherein, when tracking a mobile object in said discretized portion of the site, the at least one processing structure uses said grid points for approximating the location of the mobile object.

In some embodiments, when tracking a mobile object in said discretized portion of the site, the at least one processing structure calculates a posterior position probability of the mobile object.

In some embodiments, the at least one processing structure identifies at least one mobile object from the captured images using biometric observation made from the captured images.

In some embodiments, the biometric observation comprise at least one of face characteristics and gait, and wherein the at least one processing structure makes the biometric observation using at least one of face recognition and gait recognition.

In some embodiments, at least a portion of the tag devices store a first ID for identifying the type of the associated mobile object.

In some embodiments, at least one of said tag devices is a smart phone.

In some embodiments, at least one of said tag devices comprises a microphone, and wherein the at least one processing structure uses tag measurement obtained from the microphone to detect at least one of room reverberation, background noise level and spectrum of noise, for establishing the FFC-tag association.

In some embodiments, at least one of said tag devices comprises a microphone, and wherein the at least one processing structure uses tag measurement obtained from the microphone to detect motion related sound, for establishing the FFC-tag association.

In some embodiments, said motion related sound comprises at least one of brushing of clothes against the microphone, sound of a wheeled object wheeling over a floor surface and sound of an object sliding on a floor surface.

In some embodiments, one or more first tag device broadcast an ultrasonic sound signature, and wherein at least a second tag device comprises a microphone for receiving and detecting the ultrasonic sound signature broadcast from said one or more first tag devices, for establishing the FFC-tag association.

In some embodiments, the one or more processing structures are processing structures of one or more computer servers.

According to another aspect of this disclosure, there is provided a method of tracking at least one mobile object in at least one visual field of view. The method comprises: capturing at least one image of the at least one visual field of view; identifying at least one candidate mobile object in the at least one image; obtaining one or more tag measurements from at least one tag device, each of said at least one tag device being associated with a mobile object and moveable therewith; and tracking at least one mobile object using the at least one image and the one or more tag measurements.

In some embodiments, the method further comprises: analyzing the at least one image for determining a set of candidate tag devices for providing said one or more tag measurements.

In some embodiments, the method further comprises: analyzing the at least one image for selecting said at least one of the one or more tag measurements.

In some embodiments, the method further comprises: identifying, from the at least one image, one or more foreground feature clusters (FFCs) for tracking the at least one mobile object, and determines a bounding box and a tracking point therefor, said tracking point being at a bottom edge of the bounding box.

In some embodiments, the method further comprises: associating each tag device with one of the FFCs.

In some embodiments, the method further comprises: calculating an FFC-tag association probability indicating the reliability of the association between the tag device and the FFC.

In some embodiments, the method further comprises: tracking the FFCs using a first order Markov process.

In some embodiments, the method further comprises: discretizing at least a portion of the site into a plurality of grid points; and tracking a mobile object in said discretized portion of the site by using said grid points for approximating the location of the mobile object.

According to another aspect of this disclosure, there is provided a non-transitory, computer readable storage device comprising computer-executable instructions for tracking at least one mobile object in a site, wherein the instructions, when executed, cause a first processor to perform actions comprising: capturing at least one image of the at least one visual field of view; identifying at least one candidate mobile object in the at least one image; obtaining one or more tag measurements from at least one tag device, each of said at least one tag device being associated with a mobile object and moveable therewith; and tracking at least one mobile object using the at least one image and the one or more tag measurements.

In some embodiments, the storage device further comprises computer-executable instructions, when executed, causing the one or more processing structure to perform actions comprising: calculating an FFC-tag association probability indicating the reliability of the association between the tag device and the FFC.

In some embodiments, the storage device further comprises computer-executable instructions, when executed, causing the one or more processing structure to perform actions comprising: analyzing the at least one image for selecting said at least one of the one or more tag measurements.

In some embodiments, the storage device further comprises computer-executable instructions, when executed, causing the one or more processing structure to perform actions comprising: identifying, from the at least one image, one or more foreground feature clusters (FFCs) for tracking the at least one mobile object, and determines a bounding box and a tracking point therefor, said tracking point being at a bottom edge of the bounding box.

In some embodiments, the storage device further comprises computer-executable instructions, when executed, causing the one or more processing structure to perform actions comprising: associating each tag device with one of the FFCs.

In some embodiments, the storage device further comprises computer-executable instructions, when executed, causing the one or more processing structure to perform actions comprising: calculating an FFC-tag association probability indicating the reliability of the association between the tag device and the FFC.

In some embodiments, the storage device further comprises computer-executable instructions, when executed, causing the one or more processing structure to perform actions comprising: discretizing at least a portion of the site into a plurality of grid points; and tracking a mobile object in said discretized portion of the site by using said grid points for approximating the location of the mobile object.

BRIEF DESCRIPTION OF THE DRAWINGS

FIGS. 17A and 17B are graphs for a deterministic example, where a mobile object is moving left to right along the x-axis in the FOV of an imaging device, wherein FIG. 17A is a state transition diagram, and FIG. 17B shows a graph of simulation results;

FIGS. 18A to 18C show another example, where a mobile object is slewing to the right hand side along the x-axis in the FOV of an imaging device, wherein FIG. 18A is a state transition diagram, and FIGS. 18B and 18C are graphs of simulation results of the mean and the standard deviation (STD) of x- and y-coordinates of the mobile object, respectively;

DETAILED DESCRIPTION

In the following, a method and system for tracking mobile objects in a site are disclosed. The system comprises one or more computer servers, e.g., a so-called computer cloud, communicating with one or more imaging devices and one or more tag devices. Each tag device is attached to a mobile object, and has one or more sensors for sensing the motion of the mobile object. The computer cloud visually tracks mobile objects in the site using image streams captured by the imaging devices, and uses measurements obtained from tag devices to resolve ambiguity occurred in mobile object tracking. The computer cloud uses an optimization method to reduce power consumption of tag devices.

System Overview

Figure 1:
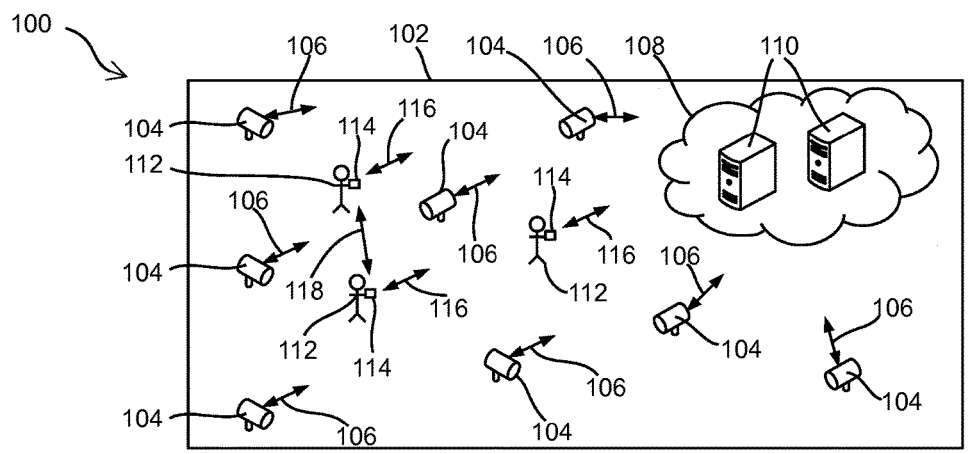
FIG. 1 is a schematic diagram showing an object tracking system deployed in a site, according to one embodiment.

Turning to FIG. 1, an object tracking system is shown, and is generally identified using numeral 100. The object tracking system 100 comprises one or more imaging devices 104, e.g., security cameras or other camera devices, deployed in a site 102, such as a campus, a building, a shopping center or the like. Each imaging device 104 is communicated with a computer network or cloud 108 via suitable wired communication means 106, such as Ethernet, serial cable, parallel cable, USB cable, HDMI® cable or the like, and/or via suitable wireless communication means such as Wi-Fi®, Bluetooth®, ZigBee®, 3G or 4G wireless telecommunications or the like. In this embodiment, the computer cloud 108 is also deployed in the site 102, and comprises one or more server computers 110 interconnected via necessary communication infrastructure.

One or more mobile objects 112, e.g., one or more persons, enter the site 102, and may move to different locations therein. From time to time, some mobile objects 112 may be moving, and some other mobile objects 112 may be stationary. Each mobile object 112 is associated with a tag device 114 movable therewith. Each tag device 114 communicates with the computer cloud 108 via suitable wireless communication means 116, such as Wi-Fi®, Bluetooth®, ZigBee®, 3G or 4G wireless telecommunications, or the like. The tag devices 114 may also communicate with other nearby tag devices using suitable peer-to-peer wireless communication means 118. Some mobile objects may not have a tag device associated therewith, and such objects cannot benefit fully from the embodiments disclosed herein.

The computer cloud 108 comprises one or more server computers 110 connected via suitable wired communication means 106. As those skilled in the art understand, the server computers 110 may be any computing devices suitable for acting as servers. Typically, a server computer may comprise one or more processing structures such as one or more single-core or multiple-core central processing units (CPUs), memory, input/output (I/O) interfaces including suitable wired or wireless networking interfaces, and control circuits connecting various computer components. The CPUs may be, e.g., Intel® microprocessors offered by Intel Corporation of Santa Clara, Calif., USA, AMD® microprocessors offered by Advanced Micro Devices of Sunnyvale, Calif., USA, ARM® microprocessors manufactured by a variety of manufactures under the ARM® architecture developed by ARM Ltd. of Cambridge, UK, or the like. The memory may be volatile and/or non-volatile, non-removable or removable memory such as RAM, ROM, EEPROM, solid-state memory, hard disks, CD, DVD, solid-state memory, flash memory, or the like. The networking interfaces may be wired networking interfaces such as Ethernet interfaces, or wireless networking interfaces such as WiFi®, Bluetooth®, 3G or 4G mobile telecommunication, ZigBee®, or the like. In some embodiments, parallel ports, serial ports, USB connections may also be used for networking although they are usually considered as input/output interfaces for connecting input/output devices. The I/O interfaces may also comprise keyboards, computer mice, monitors, speakers and the like.

The imaging devices 104 are usually deployed in the site 102 covering most or all of the common traffic areas thereof, and/or other areas of interest. The imaging devices 104 capture images of the site 102 in their respective field of views (FOVs). Images captured by each imaging device 104 may comprise the images of one or more mobile objects 112 within the FOV thereof.

Each captured image is sometimes called an image frame. Each imaging device 104 captures images or image frames at a designated frame rate, e.g., in some embodiments, 30 frames per second (fps), i.e., capturing 30 images per second. Of course, those skilled in the art understand that the imaging devices may capture image streams at other frame rates. The frame rate of an imaging device may be a predefined frame rate, or a frame rate adaptively designated by the computer cloud 108. In some embodiments, all imaging devices have the same frame rate. In some other embodiments, imaging devices may have different frame rate.

As the frame rate of each imaging device is known, each image frame is thus captured at a known time instant, and the time interval between each pair of consecutively captured image frames is also known. As will be described in more detail later, the computer cloud 108 analyses captured image frames to detect and track mobile objects. In some embodiments, the computer cloud 108 detects and tracks mobile objects in the FOV of each imaging device by individual analyzing each image frame captured therefrom (i.e., without using historical image frames). In some alternative embodiments, the computer cloud 108 detects and tracks mobile objects in the FOV of each imaging device by analyzing a set of consecutively captured images, including the most recently captured image and a plurality of previously consecutively captured images. In some other embodiments, the computer cloud 108 may combine image frames captured by a plurality of imaging devices for detecting and tracking mobile objects.

Ambiguity may occur during visual tracking of mobile objects. Ambiguity is a well-known issue in visual object tracking, and includes a variety of situations that cause visual object tracking less reliable or even unreliable.

Ambiguity may occur in a single imaging device capturing images of a single mobile object. For example, in a series of images captured by an imaging device, a mobile object is detected moving towards a bush, disappeared and then appearing from the opposite side of the bush. Ambiguity may occur as it may be uncertain whether the images captured a mobile object passing the bush from behind, or the images captured a first mobile object moved behind the bush and stayed therebehind, and then a second mobile object previously staying behind the bush now moved out thereof.

Ambiguity may occur in a single imaging device capturing images of multiple mobile objects. For example, in a series of image frames captured by an imaging device, two mobile objects are detected moving towards each other, merging to one object, and then separating to two objects again and moving apart from each other. Ambiguity occurs in this situation as it may be uncertain whether the two mobile objects are crossing each other or the two mobile objects are moving towards each other to a meeting point (appearing in the captured images as one object), and then turning back to their respective coming directions.

Ambiguity may occur across multiple imaging devices. For example, in images captured by a first imaging device, a mobile object moves and disappears from the field of view (FOV) of the first imaging device. Then, in images captured by a second, neighboring imaging device, a mobile object appears in the FOV thereof. Ambiguity may occur in this situation as it may be uncertain whether it was a same mobile object moving from the FOV of the first imaging device into that of the second imaging device, or a first mobile object moved out of the FOV the first imaging device and a second mobile object moved into of the FOV the second imaging device.

Other types of ambiguity in visual object tracking are also possible. For example, when determining the location of a mobile object in the site 102 based on the location of the mobile object in a captured image, ambiguity may occur as the determined location may not have sufficient precision required by the system.

In embodiments disclosed herein, when ambiguity occurs, the system uses tag measurements obtain from tag devices to associate objects detected in captured images and the tag devices for resolving the ambiguity.

Each tag device 114 is a small, battery-operated electronic device, which in some embodiments, may be a device designed specifically for mobile object tracking, or alternatively may be a multi-purpose mobile device suitable for mobile device tracking, e.g., a smartphone, a tablet, a smart watch and the like. Moreover, in some alternative embodiments, some tag devices may be integrated with the corresponding mobile objects such as carts, wheelchairs, robots and the like.

Each tag device comprises a processing structure, one or more sensors and necessary circuit connecting the sensors to the processing structure. The processing structure controls the sensors to collect data, also called tag measurements or tag observations, and establishes communication with the computer cloud 108. In some embodiments, the processing structure may also establish peer-to-peer communication with other tag devices 114. Each tag device also comprises a unique identification code, which is used by the computer cloud 108 for uniquely identifying the tag devices 114 in the site 102.

In different embodiments, the tag device 114 may comprise one or more sensors for collecting tag measurements regarding the mobile object 112. The number and types of sensors used in each embodiment depend on the design target thereof, and may be selected by the system designer as needed and/or desired. The sensors may include, but not limited to, an inertial Measurement Unit (IMU) having accelerometers and/or gyroscopes (e.g., rate gyros) for motion detection, a barometer for measuring atmospheric pressure, a thermometer for measuring temperature external to the tag 114, a magnetometer, a global navigation satellite system (GNSS) sensor, e.g., a Global Positioning System (GPS) receiver, an audio frequency microphone, a light sensor, a camera, and an RSS measurement sensors for measuring the signal strength of a received wireless signal.

An RSS measurement sensor is a sensor for measuring the signal strength of a received wireless signal received from a transmitter, for estimating the distance from the transmitter. The RSS measurement may be useful for estimating the location of a tag device 114. As described above, a tag device 114 may communicate with other nearby tag devices 114 using peer-to-peer communications 118. For example, some tag devices 114 may comprise a short-distance communication device such as a Bluetooth® Low Energy (BLE) device. Examples of BLE devices include transceivers using the iBeacon™ technology specified by Apple Inc. of Cupertino, Calif., U.S.A. or using Samsung's Proximity™ technology. As those skilled in the art understand, a BLE device broadcasts a BLE signal (so-called BLE beacon), and/or receives BLE beacons transmitted from nearby BLE devices. A BLE device may be a mobile device such as a tag device 114, a smartphone, a tablet, a laptop, a personal data assistant (PDA) or the like that uses a BLE technology. A BLE device may also be a stationary device such as a BLE transmitter deployed in the site 102.

A BLE device may detect BLE beacons transmitted from nearby BLE devices, determine their identities using the information embedded in the BLE beacons, and establish peer-to-peer link therewith. A BLE beacon usually includes a universally unique identifier (UUID), a Major ID and a Minor ID. The UUID generally represents a group, e.g., an organization, a firm, a company or the like, and is the same for all BLE devices in a same group. The Major ID represents a subgroup, e.g., a store of a retail company, and is the same for all BLE devices in a same subgroup. The Minor ID represents the BLE device in a subgroup. The combination of the UUID, Major ID and Minor ID, i.e., (UUID, Major ID, Minor ID), then uniquely determines the identity of the BLE device.

The short-distance communication device may comprise sensors for wireless receiver signal strength (RSS) measurement, e.g., Bluetooth® RSS measurement. As those skilled in the art appreciate, a BLE beacon may further include a reference transmit signal power indicator. Therefore, a tag device 114, when detects a BLE beacon broadcast from a nearby transmitter BLE device (which may be a nearby tag device 114 or a different BLE device such as a BLE transmitter deployed in the site 102), may measure the received signal power of the BLE beacon obtaining a RSS measurement, and compare the RSS measurement with the reference transmit signal power embedded in the BLE beacon to estimate the distance from the transmitter BLE device.

The system 100 therefore may use the RSS measurement obtained by a target tag device regarding the BLE beacon of a transmitter BLE device to determine that two mobile objects 112 are in close proximity such as two persons in contact, conversing, or the like (if the transmitter BLE device is another tag device 114), or to estimate the location of the mobile object 112 associated with the target tag device (if the transmitter BLE device is a BLE transmitter deployed at a known location), which may be used to facilitate the detection and tracking of the mobile object 112.

Alternatively, in some embodiments, the system may comprise a map of the site 102 indicative of the transmitter signal strength of a plurality of wireless signal transmitters, e.g., Bluetooth and/or WiFi access points, deployed at known locations of the site 102. The system 100 may use this wireless signal strength map and compare with the RSS measurement of a tag device 114 to estimate the location of the tag device 114. In these embodiments, the wireless signal transmitters do not need to include a reference transmit signal power indicator in the beacon.

The computer cloud 108 tracks the mobile objects 112 using information obtained from images captured by the one or more imaging devices 104 and from the above-mentioned sensor data of the tag devices 114. In particular, the computer cloud 108 detects foreground objects or foreground feature clusters (FFCs) from images captured by the imaging devices 104 using image processing technologies.

Herein, the imaging devices 104 are located at fixed locations in the site 102, generally oriented toward a fixed direction (except that in some embodiments an imaging device may occasionally pan to a different direction), and focused, to provide a reasonably static background. Moreover, the lighting in the FOV of each imaging device is generally unchanged for the time intervals of interest, or the lighting changing slowly that it may be considered unchanged among a finite number of consecutively captured images. Generally, the computer cloud 108 maintains a background image for each imaging device 104, which typically comprising image of permanent features of the site such as floor, ceiling, walls and the like, and semi-permanent structures such as furniture, plants, trees and the like. The computer cloud 108 periodically updates the background images.

Mobile objects, being moving or stationary, generally appear in the captured images as foreground objects or FFCs that occlude the background. Each FFC is an identified area in the captured images corresponding to a moving object that may be associated with a tag device 114. Each FFC is bounded by a bounding box. A mobile object being stationary for an extended period of time, however, may become a part of the background and undetectable from the captured images.

The computer cloud 108 associates detected FFCs with tag devices 114 using the information of the captured images and information received from the tag devices 114, for example, both evidencing motion of 1 meter per second. As each tag device 114 is associated with a mobile object 112, an FFC successfully associated with a tag device 114 is then considered an identified mobile object 112, and is tracked in the site 102.

Obviously, there may exist mobile objects in the site 102 but not associated with any tag device 114, which cannot be identified. Such unidentified mobile objects may be robots, animals, or may be people without a tag device. In this embodiment, unidentified mobile objects are ignored by the computer cloud 108. However, those skilled in the art appreciate that, alternatively, the unidentified mobile objects may also be tracked, to some extent, solely by using images captured by the one or more imaging devices 104.

Figure 2:
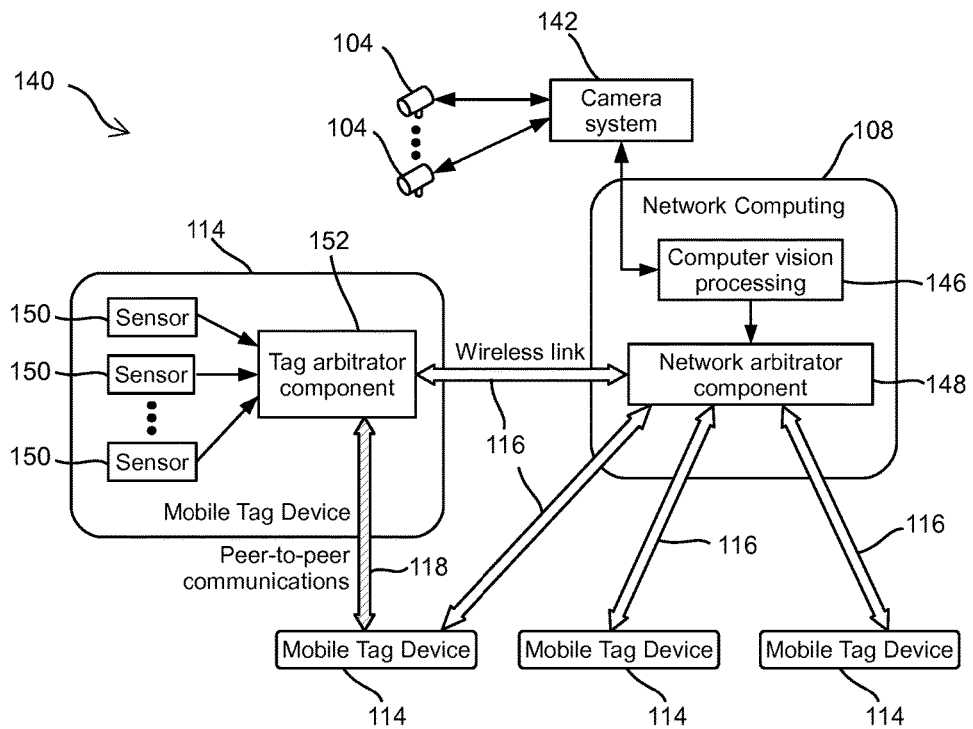
FIG. 2 is a schematic diagram showing the functional structure of the object tracking system of FIG. 1.

FIG. 2 is a schematic diagram showing the functional structure 140 of the object tracking system 100. As shown, the computer cloud 108 functionally comprises a computer vision processing structure 146 and a network arbitrator component 148. Each tag device 114 functionally comprises one or more sensors 150 and a tag arbitrator component 152.

The network arbitrator component 148 and the tag arbitrator component 152 are the central components of the system 100 as they "arbitrate" the observations to be done by the tag device 114. The network arbitrator component 148 is a master component and the tag arbitrator components 152 are slave components. Multiple tag arbitrator components 152 may communicate with the network arbitrator component 148 at the same time and observations therefrom may be jointly processed by the network arbitrator component 148.

The network arbitrator component 148 manages all tag devices 114 in the site 102. When a mobile object 112 having a tag device 114 enters the site 102, the tag arbitrator component 152 of the tag device 114 automatically establishes communication with the network arbitrator component 148 of the computer cloud 108, via a so called "handshaking" process. With handshaking, the tag arbitrator component 152 communicates its unique identification code to the network arbitrator component 148. The network arbitrator component 148 registers the tag device 114 in a tag device registration table (e.g., a table in a database), and communicates with the tag arbitrator component 152 of the tag device 114 to understand what types of tag measurements can be provided by the tag device 114 and how much energy each tag measurement will consume.

During mobile object tracking, the network arbitrator component 148 maintains communication with the tag arbitrator components 152 of all tag devices 114, and may request one or more tag arbitrator component 152 to provide one or more tag measurements. The tag measurements that a tag device 114 can provide depend on the sensors installed in the tag device. For example, accelerometers have an output triggered by magnitude of change of acceleration, which can be used for sensing the moving of the tag device 114. The accelerometer and rate gyro can provide motion measurement of the tag device 114 or the mobile object 112 associated therewith. The barometer may provide air pressure measurement indicative of the elevation of the tag device 114.

With the information of each tag device 114 obtained during handshaking, the network arbitrator component 148 can dynamically determine, which tag devices and what tag measurements therefrom are needed to facilitate mobile object tracking with minimum power consumption incurred to the tag devices (described in more detail later).

When the network arbitrator component 148 is no longer able to communicate with the tag arbitrator component 152 of a tag device 114 for a predefined period of time, the network arbitrator component 148 considers that the tag device 114 has left the site 102 or has been deactivated or turned off. The network arbitrator component 148 then deletes the tag device 114 from the tag device registration table.

Shown in FIG. 2, a camera system 142 such as a security camera system (SCS) controls the one or more imaging devices 104, collects images captured by the imaging devices 104, and sends captured images to the computer vision processing structure 146.

The computer vision processing structure 146 processes the received images for detecting FFCs therein. Generally, the computer vision processing structure 146 maintains a background image for each imaging device 104. When an image captured by an imaging device 104 is sent to the computer vision processing structure 146, the computer vision processing structure 146 calculates the difference between the received image and the stored background image to obtain a difference image. With suitable image processing technology, the computer vision processing structure 146 detects the FFCs from the difference image. In this embodiment, the computer vision processing structure 146 periodically updates the background image to adapt to the change of the background environment, e.g., the illumination change from time to time.

Figure 3:
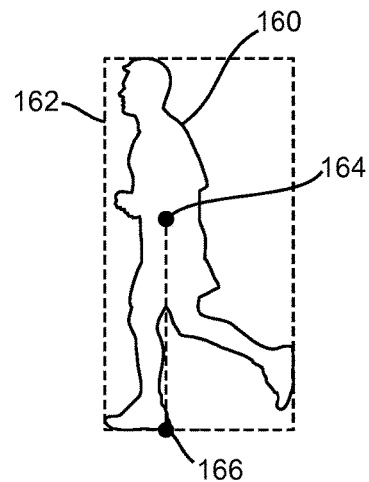
FIG. 3 shows a foreground feature cluster (FFC) detected in a captured image.

FIG. 3 shows an FFC 160 detected in a captured image. As shown, a bounding box 162 is created around the extremes of the blob of the FFC 160. In this embodiment, the bounding box is a rectangular bounding box, and is used in image analysis unless detail, e.g., color, pose and other features, of the FFC is required.

A centroid 164 of FFC 160 is determined. Here, the centroid 164 is not necessarily the center of the bounding box 162.

A bounding box tracking point (BBTP) 166 is determined at a location on the lower edge of the bounding box 162 such that a virtual line between the centroid 164 and the BBTP 166 is perpendicular to the lower edge of the bounding box 162. The BBTP 166 is used for determining the location of the FFC 160 (more precisely the mobile object represented by FFC 160) in the site 102. In some alternative embodiments, both the centroid 164 and the BBTP 166 are used for determining the location of the FFC 160 in the site 102.

In some embodiments, the outline of the FFC 160 may be reduced to a small set of features based on posture to determine, e.g., if the corresponding mobile object 112 is standing or walking. Moreover, analysis of the FFC 160 detected over a group of sequentially captured images may show that the FFC 160 is walking and may further provide an estimate of the gait frequency. As will be described in more detail later, a tag-image correlation between the tag measurements, e.g., gait frequency obtained by tag devices, and the analysis results of the captured images may be calculated for establishing FFC-tag association.

The computer vision processing structure 146 sends detected FFCs to the network arbitrator component 148. The network arbitrator component 148 associate the detected FFCs with tag devices 114, and, if needed, communicates with the tag arbitrator components 152 of the tag devices 114 to obtain tag measurements therefrom for facilitating FFC-tag association.

The tag arbitrator component 152 of a tag device 114 may communicate with the tag arbitrator components 152 of other nearby tag devices 114 using peer-to-peer communications 118.

Figure 4:
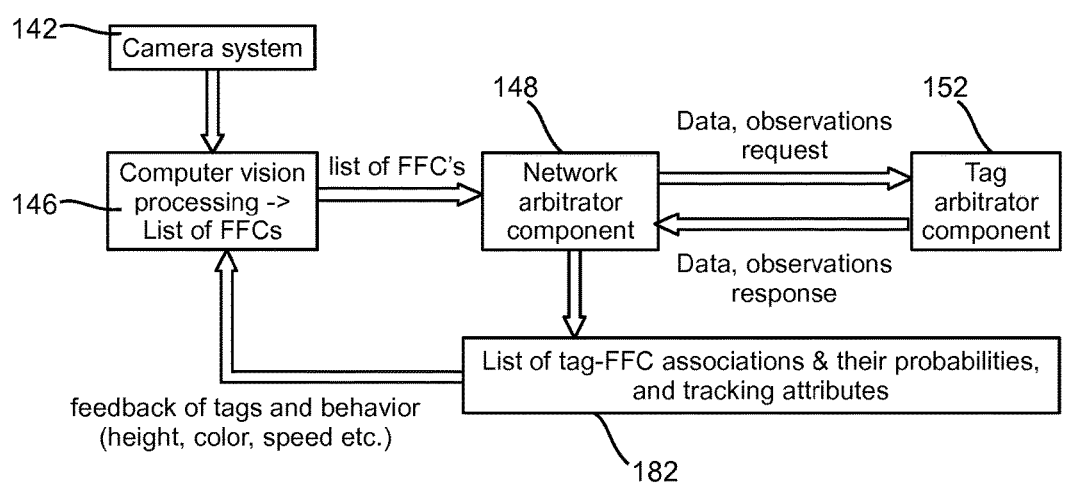
FIG. 4 is a schematic diagram showing the main function blocks of the system of FIG. 1 and the data flow therebetween.

FIG. 4 is a schematic diagram showing the main function blocks of the system 100 and the data flows therebetween. As shown, the camera system 142 feeds images captured by the cameras 104 in the site 102 into the computer vision processing block 146. The computer vision processing block 146 processes the images received from the camera system 142 such as necessary filtering, image corrections and the like, and isolates or detects a set of FFCs in the images that may be associated with tag devices 114.

The set of FFCs and their associated bounding boxes are then sent to the network arbitrator component 148. The network arbitrator component 148 analyzes the FFCs and may request the tag arbitrator components 152 of one or more tag devices 114 to report tag measurements for facilitating FFC-tag association.

Upon receiving a request from the network arbitrator component 148, the tag arbitrator component 152 in response makes necessary tag measurements from the sensors 150 of the tag device 114, and sends tag measurements to the network arbitrator component 148. The network arbitrator component 148 uses received tag measurements to establish the association between the FFCs and the tag devices 114. Each FFC associated with a tag device 114 is considered as an identified mobile object 112 and is tracked by the system 100.

The network arbitrator component 148 stores each FFC-tag association and an association probability thereof (FFC-tag association probability, described later) in a tracking table 182 (e.g., a table in a database). The tracking table 182 is updated every frame as required.

Data of FFC-tag associations in the tracking table 182, such as the height, color, speed and other feasible characteristics of the FFCs, is fed back to the computer vision processing block 146 for facilitating the computer vision processing block 146 to better detect the FFC in subsequent images.

Figure 5A:
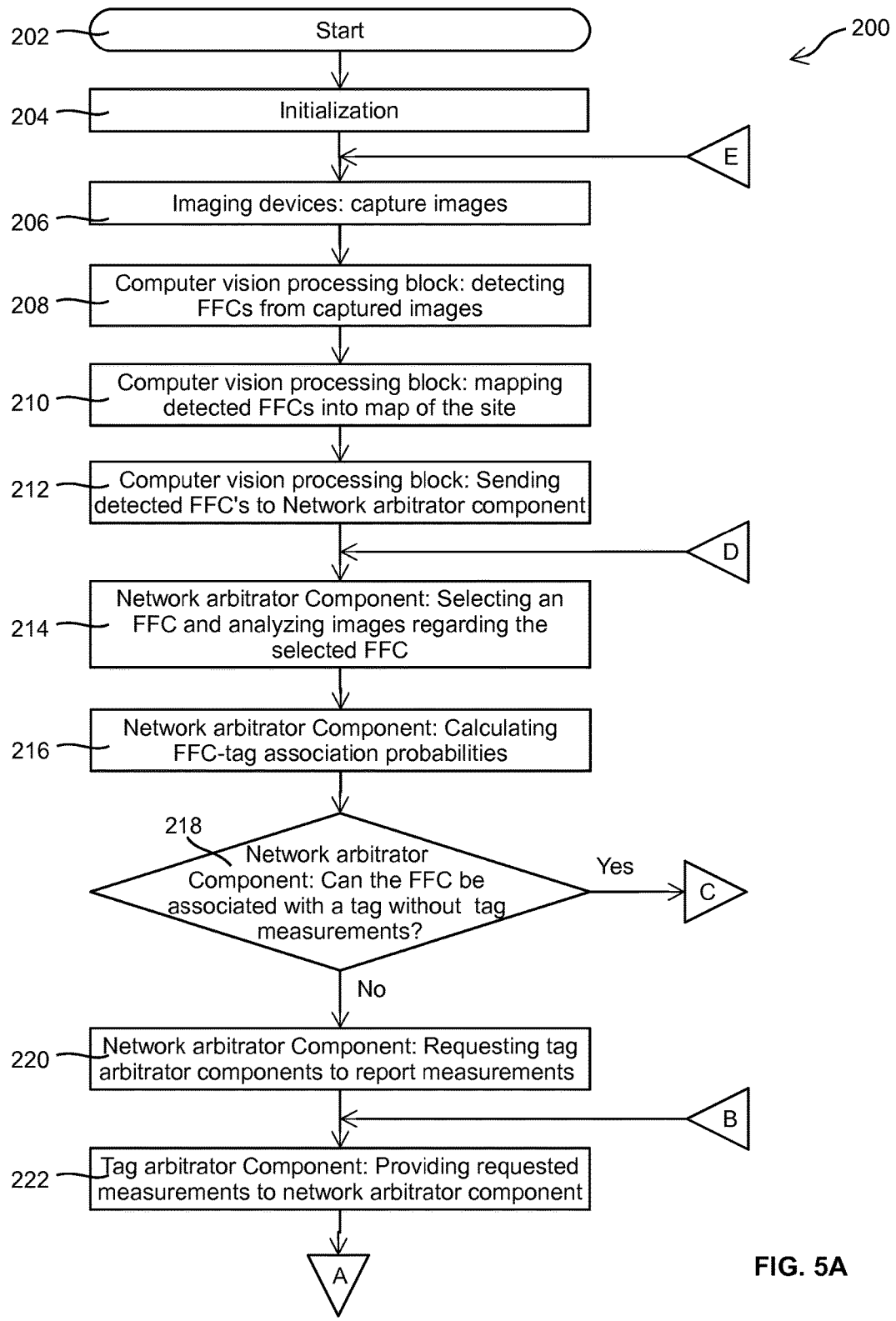
FIGS. 5A and 5B illustrate connected flowcharts showing steps of a process of tracking mobile objects using a vision assisted hybrid location algorithm.
Figure 5B:
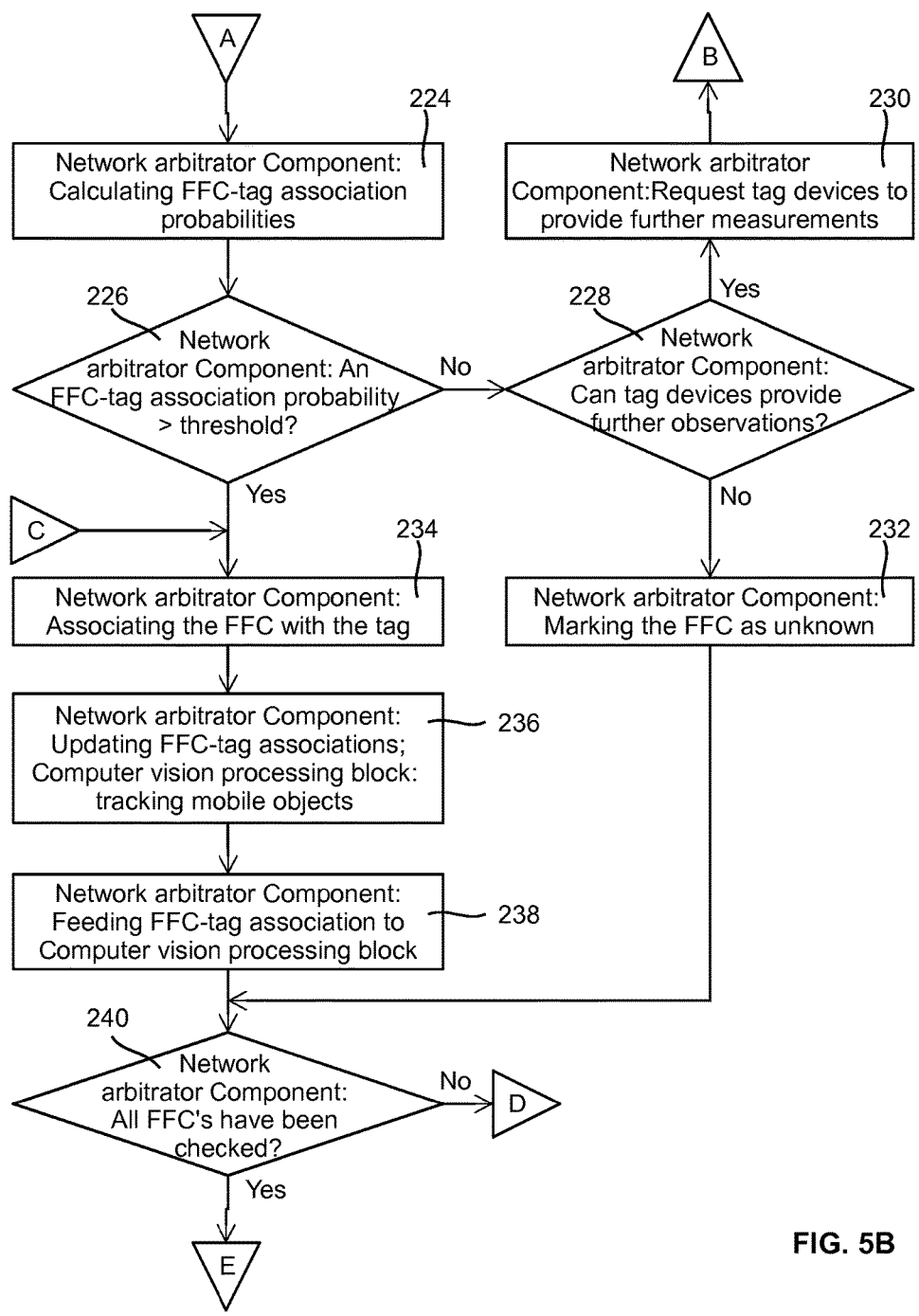

FIGS. 5A and 5B illustrate a flowchart 200, in two sheets, showing steps of a process of tracking mobile objects 112 using a vision assisted hybrid location algorithm. As described before, a mobile object 112 is considered by the system 100 as an FFC associated with a tag device 114, or an "FFC-tag association" for simplicity of description.

The process starts when the system is started (step 202). After start, the system first go through an initialization step 204 to ensure that all function blocks are ready for tracking mobile objects. For ease of illustration, this step also includes tag device initialization that will be executed whenever a tag device enters the site 102.

As described above, when a tag device 114 is activated, e.g., entering the site 102, or upon turning on, it automatically establishes communication with the computer cloud 108, via the "handshaking" process, to register itself in the computer cloud 108 and to report to the computer cloud regarding what types of tag measurements can be provided by the tag device 114 and how much energy each tag measurement will consume.

As the newly activated tag device 114 does not have any prior association with an FFC, the computer cloud 108, during handshaking, requests the tag device 114 to conduct a set of observations or measurements to facilitate the subsequent FFC-tag association with a sufficient FFC-tag association probability. For example, in an embodiment, the site 102 is a building, with a Radio-frequency identification (RFID) reader and an imaging device 104 installed at the entrance thereof. A mobile object 112 is equipped with a tag device 114 having an RFID tag. When the mobile object 112 enters the site 102 through the entrance thereof, the system detects the tag device 114 via the RFID reader. The detection of the tag device 114 is then used for associating the tag device with the FFC detected in the images captured by the imaging device at the entrance of the site 102.

Alternatively, facial recognition using images captured by the imaging device at the entrance of the site 102 may be used to establish initial FFC-tag association. In some alternatively embodiments, other biometric sensors coupled to the computer cloud 108, e.g., iris or fingerprint scanners, may be used to establish initial FFC-tag association.

After initialization, each imaging device 104 of the camera system 142 captures images of the site 102, and send a stream of captured images to the computer vision processing block 146 (step 206).

The computer vision processing block 146 detects FFCs from the received image streams (step 208). As described before, the computer vision processing structure 146 maintains a background image for each imaging device 104. When a captured image is received, the computer vision processing structure 146 calculates the difference between the received image and the stored background image to obtain a difference image, and detects FFCs from the difference image.

The computer vision processing block 146 then maps the detected FFCs into a three-dimensional (3D), physical-world coordinate system of the site by using, e.g., a perspective mapping or perspective transform technology (step 210). With the perspective mapping technology, the computer vision processing block 146 maps points in a two-dimensional (2D) image coordinate system (i.e., a camera coordinate system) to points in the 3D, physical-world coordinate system of the site using a 3D model of the site. The 3D model of site is generally a description of the site and comprises a plurality of localized planes connected by stairs and ramps. The computer vision processing block 146 determines the location of the corresponding mobile object in the site by mapping the BBTP and/or the centroid of the FFC to the 3D coordinate system of the site.

The computer vision processing block 146 sends detected FFCs, including their bounding boxes, BBTPs, their locations in the site and other relevant information, to the network arbitrator component 148 (step 212). The network arbitrator component 148 then collaborates with the tag arbitrator components 152 to associate each FFC with a tag device 114 and track the FFC-tag association, or, if an FFC cannot be associated with any tag device 114, mark it as unknown (steps 214 to 240).

In particular, the network arbitrator component 148 selects an FFC, and analyzes the image streams regarding the selected FFC (step 214). Depending on the implementation, in some embodiments, the image stream from the imaging device that captures the selected FFC is analyzed. In some other embodiments, other image streams, such as image streams from neighboring imaging devices, are also used in the analysis.

In this embodiment, the network arbitrator component 148 uses a position estimation method based on a suitable statistic model, such as a first order Markov process, and in particular, uses a Kalman filter with a first order Markov Gaussian process, to analyze the FFCs in the current images and historical images captured by the same imaging device to associate the FFCs with tag devices 114 for tracking. Motion activities of the FFCs are estimated, which may be compared with tag measurements for facilitating the FFC-tag association.

Various types of image analysis may be used for estimating motion activity and modes of the FFCs.

For example, analyzing the BBTP of an FFC and background may determine whether the FFC is stationary or moving in foreground. Usually, a slight movement is detectable. However, as the computer vision processing structure 146 periodically updates the background image, a long-term stationary object 112 may become indistinguishable from background, and no FFC corresponding to such object 112 would be reliably detected from captured images. In some embodiments, if an FFC that has been associated with a tag device disappears at a location, i.e., the FFC is no longer detectable in the current image, but have been detected as stationary in historical images, the computer cloud 108 then assumes that a "hidden" FFC is still at the last known location, and maintains the association of the tag device with the "hidden" FFC.

By analyzing the BBTP of an FFC and background, it may be detected that an FFC spontaneously appears from the background, if the FFC is detected in the current image but not in historical images previously captured by the same imaging device. Such a spontaneous appearance of FFC may indicate that a long-term stationary mobile object starts to move, that a mobile object enters the FOV of the imaging device from a location undetectable by the imaging device (e.g., behind a door) if the FFC appears at an entrance location such as a door, or that a mobile object enters the FOV of the imaging device from the FOV of a neighboring imaging device if the FFC appears at about the edge of the captured image. In some embodiments, the computer cloud 108 jointly processes the image streams from all imaging devices. If an FFC FA associated with a tag device TA disappears from the edge of the FOV of a first imaging device, and a new FFC FB spontaneously appears in the FOV of a second, neighboring imaging device at a corresponding edge, the computer cloud 108 may determine that the mobile object previously associated with FFC FA has moved from the FOV of the first imaging device into the FOV of the second imaging device, and associates the FFC FB with the tag device TA.

By determining the BBTP in a captured image and mapping it into the 3D coordinate system of the site using perspective mapping, the location of the corresponding mobile object in the site, or its coordinate in the 3D coordinate system of the site, may be determined.

A BBTP may be mapped from a 2D image coordinate system into 3D, physical-world coordinate system of the site using perspective mapping, and various inferences can then be extracted therefrom.

For example, as will be described in more detail later, a BBTP may appear to suddenly "jump", i.e., quickly move upward, if the mobile object moves partially behind a background object and is partially occluded, or may appear to quickly move downwardly if the mobile object is moving out of the occlusion. Such a quick upward/downward movement is unrealistic from a Bayesian estimation. As will be described in more detail later, the system 100 can detect such unrealistic upward/downward movement of the BBTP and correctly identify occlusion.

Identifying occlusion may be further facilitated by a 3D site map with identified background structures, such as trees, statues, posts and the like, that may cause occlusion. By combining the site map and the tracking information mapped thereinto, a trajectory of the mobile object passing possible background occlusion objects may be derived with a high reliability.

If it is detected that the height of the bounding box of the FFC is shrinking or increasing, it may be determined that the mobile object corresponding the FFC is moving away from or moving towards the imaging device, respectively. The change of scale of the FFC bounding box may be combined with the position change of the FFC in the captured images to determine the moving direction of the corresponding mobile object. For example, if the FFC is stationary or slightly moving, but the height of the bounding box of the FFC is shrinking, it may be determined that the mobile object corresponding the FFC is moving radially away from the imaging device.

The biometrics of the FFC, such as height, width, face, stride length of walking, length of arms and/or legs, and the like may be detected using suitable algorithms for identification of the mobile object. For example, an Eigenface algorithm may be used for detecting face features of an FFC. The detected face features may be compared with those registered in a database to determine the identity of the corresponding mobile object, or be used to compare with suitable tag measurements to identify the mobile object.

The angles and motion of joints, e.g., elbows and knees, of the FFC may be detected using segmentation methods, and correlated with plausible motion as mapped into the 3D coordinate system of the site. The detected angles and motion of joints may be used for sensing the activity of the corresponding mobile object such as walking, standing, dancing or the like. For example, in FIG. 3, it may be detected that the mobile object corresponding to FFC 160 is running by analyzing the angles of the legs with respect to the body. Generally, this analysis requires at least some of the joints of the FFC is unobstructed in the captured images.

Two mobile objects may merge into one FFC in captured images. By using a Bayesian model, it may be detected that an FFC corresponding to two or more occluding objects. As will be described in more detail later, when establishing FFC-tag association, the FFC is associated with the tag devices of the occluding mobile objects.

Similarly, two or more FFCs may emerge from a previously single FFC, which may be detected by using the Bayesian model. As will be described in more detail later, when establishing FFC-tag association, each of these FFCs is associated with a tag device with an FFC-tag association probability.

As described above, based on the perspective mapping, the direction of the movement of an FFC may be detected. With the assumption that the corresponding mobile object is always facing the direction of the movement, the heading of the mobile object may be detected by tracking the change of direction of the FFC in the 3D coordinate system. If the movement trajectory of the FFC changes direction, the direction change of the FFC would be highly correlated with the change of direction sensed by the IMU of the corresponding tag device.

Therefore, tag measurements comprising data obtained from the IMU (comprising accelerometer and/or gyroscope) may be used to for calculating a tag-image correlation between the IMU data, or data obtained from the accelerometer and/or gyroscope, and the FFC analysis of captured images to determine whether the mobile object corresponding to the FFC is changing its moving direction. In an alternative embodiment, data obtained from a magnetometer may be used and correlated with the FFC analysis of captured images to determine whether the mobile object corresponding to the FFC is changing its moving direction.

The colors of the pixels of the FFC may also be tracked for determining the location and environment of the corresponding mobile object. Color change of the FFC may be due to lighting, the pose of the mobile object, the distance of the mobile object from the imaging device, and/or the like. A Bayesian model may be used for tracking the color attributes of the FFC.

By analyzing the FFC, a periodogram of walking gait of the corresponding mobile object may be established. The periodicity of the walking gait can be determined from the corresponding periodogram of the bounding box variations.

For example, if a mobile object is walking, the bounding box of the corresponding FFC will undulate with the object's walking. The bounding box undulation can be analyzed in terms of it frequency and depth for obtaining an indication of the walking gait.

The above list of analysis is non-exhaustive, and may be selectively included in the system 100 by a system designer in various embodiments.

Referring back to FIG. 5A, at step 216, the network arbitrator component uses the image analysis results to calculate an FFC-tag association probability between the selected FFC and each of one or more candidate tag devices 114, e.g., the tag devices 114 that have not been associated with any FFCs. At this step, no tag measurements are used in calculating the FFC-tag association probabilities.

Each calculated FFC-tag association probability is an indicative measure of the reliability of associating the FFC with a candidate tag device. If any of the calculated FFC-tag association probabilities is higher than a predefined threshold, the selected can be associated with a tag device without using any tag measurements.

In some situations, an FFC may be associated with a tag device 114 and tracked by image analysis only and without using any tag measurements. For example, if a captured image comprises only one FFC, and there is only one tag device 114 registered in the system 100, the FFC may be associated with the tag device 114 without using any tag measurements.

As another example, the network arbitrator component 148 may analyze the image stream captured by an imaging device, including the current image and historical images captured by the same imaging device, to associate an FFC in the current image with an FFC in previous images such that the associated FFCs across these images represent a same object. If such object has been previously associated with a tag device 114, then the FFC in the current image may be associated with the same tag device 114 without using any tag measurements.

As a further example, the network arbitrator component 148 may analyze a plurality of image streams, including the current images and historical images captured by the same and neighboring imaging devices, to associate an FFC with a tag device. For example, if an identified FFC in a previous image captured by a neighboring imaging device appears to be leaving the FOV thereof towards the imaging device that captures the current image, and the FFC in the current image with an FFC appears to enter the FOV thereof from the neighboring imaging device, then the FFC in the current image may be considered the same FFC in the previous image captured by the neighboring imaging device, and can be identified, i.e., associated with the tag device that was associated with the FFC in the previous image captured by the neighboring imaging device.

At step 218, the network arbitrator component 148 uses the calculated FFC-tag association probabilities to check if the selected FFC can be associated with a tag device 114 and tracked without using any tag measurements. If any of the calculated FFC-tag association probabilities is higher than a predefined threshold, the selected can be associated with a tag device without using any tag measurements, the process goes to step 234 in FIG. 5B (illustrated in FIGS. 5A and 5B using connector C).

However, if at step 218, none of the calculated FFC-tag association probabilities is higher than a predefined threshold, the selected FFC can only be associated with a tag device if further tag measurements are obtained. The network arbitrator component 148 then determines, based on the analysis of step 214, a set of tag measurements that may be most useful for establishing the FFC-tag association with a minimum tag device power consumption, and then requests the tag arbitrator components 152 of the candidate tag devices 114 to activate only the related sensors to gather the requested measurements, and report the set of tag measurements (step 220).

Depending on the sensors installed on the tag device 114, numerous attributes of a mobile object 112 may be measured.

For example, by using the accelerometer and rate gyro of the IMU, a mobile object in a stationary state may be detected. In particular, a motion measurement is first determined by combining and weighting the magnitude of the rate gyro vector and the difference in the accelerometer vector magnitude output. If the motion measurement does not exceed a predefined motion threshold for a predefined time threshold, then the tag device 114, or the mobile object 112 associated therewith, is in a stationary state. There can be different levels of static depending on how long the threshold has not been exceeded. For example, one level of static may be sitting still for 5 seconds, and another level of static may be lying inactively on a table for hours.

Similarly, a mobile object 112 transition from stationary to moving may be detected by using the accelerometer and rate gyro of the IMU. As described above, the motion measurement is first determined. If the motion measurement exceeds the predefined motion threshold for a predefined time threshold, the tag device 114 or mobile object 112 is in motion.

Slight motion, walking or running of a mobile object 112 may be detected by using the accelerometer and rate gyro of the IMU. While being non-stationary, a tag device 114 or mobile object 112 in motion of slight motion while standing in one place, walking at a regular pace, running or jumping may be further determined using outputs of the accelerometer and rate gyro. Moreover, the outputs of the accelerometer and rate gyro may also be used for recognizing gestures of the mobile object 112.

Rotating of a mobile object 112 while walking or standing still may be detected by using the accelerometer and rate gyro of the IMU. Provided that attitude of the mobile object 114 does not change during the rotation, the angle of rotation is approximately determined from the magnitude of the rotation vector, which may be determined from the outputs of the accelerometer and rate gyro.

A mobile object 112 going up/down stairs may be detected by using the barometer and accelerometer. Using output of the barometer, pressure changes may be resolvable almost to each step going up or down stairs, which may be confirmed by the gesture detected from the output of the accelerometer.

A mobile object 112 going up/down elevator may be detected by using the barometer and accelerometer. The smooth pressure changes between each floor as elevator ascends and descends may be detected from the output of the barometer, which may be confirmed by a smooth change of the accelerometer output.

A mobile object 112 going in or out of a doorway may be detected by using the thermometer and barometer. Going from outdoor to indoor or from indoor to outdoor causes a change in temperature and pressure, which may be detected from the outputs of the thermometer and barometer. Going from one room through a doorway to another room also causes change in temperature and pressure detectable by the thermometer and barometer.

Short term relative trajectory of a mobile object 112 may be detected by using the accelerometer and rate gyro. Conditioned on an initial attitude of the mobile object 114, the short term trajectory may be detected based on the integration and transformation of the outputs of the accelerometer and rate gyro. Initial attitudes of the mobile object 114 may need to be taken into account in detection of short term trajectory.

Periodogram of walking gait of a mobile object 112 may be detected by using the accelerometer and rate gyro.

Fingerprinting position and trajectory of a mobile object 112 based on magnetic vector may be determined by using magnetometer and accelerometer. In some embodiments, the system 100 comprises a magnetic field map of the site 102. Magnetometer fingerprinting, aided by the accelerometer outputs, may be used to determine the position of the tag device 114/mobile object 112. For example, by expressing the magnetometer and accelerometer measurements as two vectors, respectively, the vector cross-product of the magnetometer measurement vector and the accelerometer measurement vector can be calculated. With suitable time averaging, deviations of such a cross-product is approximately related to the magnetic field anomalies. In an indoor environment or environment surrounded by magnetic material (such as iron rods in construction), the magnetic field anomaly will vary significantly. Such magnetic field variation due to the building structure and furniture can be captured or recorded in the magnetic field site map during a calibration process. Thereby, the likelihood of the magnetic anomalies can be determined by continuously sampling the magnetic and accelerometer vectors over time and comparing the measured anomaly with that recorded in the magnetic field site map.

Fingerprinting position and trajectory of a mobile object 112 based on RSS may be determined by using RSS measurement sensors, e.g., RSS measurement sensors measuring Bluetooth and/or WiFi signal strength. By using the wireless signal strength map or reference transmit signal power indicator in the beacon as described above, the location of a tag device 114 may be approximately determined using RSS fingerprinting based on the output of the RSS measurement sensor.

A single sample of the RSS measurement taken by a tag device 114 can be highly ambiguous as it is subjected to multipath distortion of the electromagnetic radio signal. However, a sequence of samples taken by the tag device 114 as it is moving with the associated mobile object 112 will provide an average that can be correlated with an RSS radio map of the site. Consequently the trend of the RSS measurements as the mobile is moving is related to the mobile position. For example, an RSS measurement may indicate that the mobile object is moving closer to an access point at a known position. Such RSS measurement may be used with the image based object tracking for resolving ambiguity. Moreover, some types of mobile objects, such as human body, will absorb wireless electromagnetic signals, which may be leveraged from obtaining more inferences from RSS measurement.

Motion related sound, such as periodic rustling of clothes items brushing against the tag device, a wheeled object wheeling over a floor surface, sound of an object sliding on a floor surface, and the like, may be detected by using an audio microphone. Periodogram of the magnitude of the acoustic signal captured by a microphone of the tag device 114 may be used to detect walking or running gait.

Voice of the mobile object or voice of another nearby mobile object may be detected by using an audio microphone. Voice is a biometric that can be used to facilitate tag-object association. By using voice detection and voice recognition, analysis of voice picked up by the microphone can be useful for determining the background environment of the tag device 114/mobile object 112, e.g., in a quiet room, outside, in a noisy cafeteria, in a room with reverberations and the like. Voice can also be used to indicate approximate distance between two mobile objects 112 having tag devices 114. For example, if the microphones of two tag devices 114 can mutually hear each other, the system 100 may establish that the two corresponding mobile objects are at a close distance.

Proximity of two tag devices may be detected by using audio microphone and ultrasonic sounding. In some embodiments, a tag device 114 can broadcast an ultrasonic sound signature using the microphone, which may be received and detected by another tag device 114 using microphone, and used for establishing the FFC-tag association and ranging.

The above list of tag measurements is non-exhaustive, and may be selectively included in the system 100 by a system designer in various embodiments. Typically there is ample information for tag devices to measure for positively forging the FFC-tag association.

The operation of the network arbitrator component 148 and the tag arbitrator component 152 is driven by an overriding optimization objective. In other words, a constrained optimization is conducted with the objective of minimizing the tag device energy expenditure (e.g., minimizing battery consumption such that the battery of the tag device can last for several weeks). The constraint is that the estimated location of the mobile object equipping with the tag device (i.e., the tracking precision) is needed to be within an acceptable error range, e.g., within a two-meter range, and that the association probability between an FFC, i.e., an observed object, and the tag device is required to be above a pre-determined threshold.

In other words, the network arbitrator component 148, during above-mentioned handshaking process with each tag device 114, understands what types of tag measurements can be provided by the tag device 114 and how much energy each tag measurement will consume. The network arbitrator component 148 then uses the image analysis results obtained at step 214 to determine which tag measurement would likely give rise to a sufficient FFC-tag association probability higher than the predefined probability threshold with a smallest power consumption.

In some embodiments, one of the design goals of the system is to reduce the power consumption of the battery-driven tag devices 114. On the other hand, the power consumption of the computer cloud 108 is not constrained. In these embodiments, the system 100 may be designed in such a way that the computer cloud 108 takes as much computation as possible to reduce the computation need of the tag devices 114. Therefore, the computer cloud 108 may employ complex vision-based object detection methods such as face recognition, gesture recognition and other suitable biometrics detection methods, and jointly processing the image streams captured by all imaging devices, to identify as many mobile objects as feasible, within their capability. The computer cloud 108 requests tag devices to report tag measurements only when necessary.

Referring back to FIG. 5A, at step 222, the tag arbitrator components 152 of the candidate tag devices 114 receive the tag measurement request from the network arbitrator component 148. In response, each tag arbitrator component 152 makes requested tag measurements and report tag measurements to the network arbitrator component 148. The process then goes to step 224 of FIG. 5B (illustrated in FIGS. 5A and 5B using connector A).

In this embodiment, at step 222, the tag arbitrator component 152 collects data from suitable sensors 150 and processes collected data to obtain tag measurements. The tag arbitrator component 152 sends tag measurements, rather than raw sensor data, to the network arbitrator component 148 to save transmission bandwidth and cost.

For example, if the network arbitrator component 148 requests a tag arbitrator component 152 to report whether its associated mobile object is stationary or walking, the tag arbitrator component 152 collects data and the IMU and processes collected IMU data to calculate a walking probability indicating the likelihood of the associated mobile object being walking. The tag arbitrator component 152 then sends the calculated walking probability to the network arbitrator component 148. Comparing to transmitting the raw IMU data, transmitting the calculated walking probability of course consumes much less communication bandwidth and power.

At step 224 (FIG. 5B), the network arbitrator component 148 then correlates the image analysis results of the FFC and the tag measurements received thererfrom and calculates an FFC-tag association probability between the FFC and each candidate tag device 114.

At step 226, the network arbitrator component 148 checks if any of the calculated FFC-tag association probabilities is greater than the predefined probability threshold. If a calculated FFC-tag association probability is greater than the predefined probability threshold, the network arbitrator component 148 associates the FFC with the corresponding tag device 114 (step 234).

At step 236, the network arbitrator component 148 stores the FFC-tag association in the tracking table 182, together with data related thereto such as the location, speed, moving direction, and the like, if the tag device 114 has not yet been associated with any FFC, or update the FFC-tag association in the tracking table if the tag device 114 has already associated with an FFC in previous processing. The computer vision processing block 146 tracks the FFCs/mobile objects.

In this way, the system continuously detects and tracks the mobile objects 112 in the site 102 until the tag device 114 is no longer detectable, implying that the mobile object 112 has been stationary for an extended period of time or has moved out of the site 102, or until the tag device 114 cannot be associated with any FFC, implying that the mobile object 112 is at an undetectable location in the site (e.g., a location beyond the FOV of all imaging devices).

After storing/updating the FFC-tag association, the network arbitrator component 148 sends data of the FFC-tag association, such as the height, color, speed and other feasible characteristics of the FFCs, to the computer vision processing block 146 (step 238) for facilitating the computer vision processing block 146 to better detect the FFC in subsequent images, e.g., facilitating the computer vision processing block 146 in background differencing and bounding box estimation.

The process then goes to step 240, and the network arbitrator component 148 checks if all FFCs have been processed. If yes, the process goes to step 206 of FIG. 5A (illustrated in FIGS. 5A and 5B using connector E) to process further images captured by the imaging devices 104. If not, the process loops to step 214 of FIG. 5A (illustrated in FIGS. 5A and 5B using connector D) to select another FFC for processing.

If, at step 226, the network arbitrator component 148 determines that no calculated FFC-tag association probability is greater than the predefined threshold, the network arbitrator component 148 then checks if the candidate tag devices 114 can provide further tag measurements helpful in leading to a sufficiently high FFC-tag association probability (step 228), and if yes, requests the candidate tag devices 114 to provide further tag measurements (step 230). The process then loops to step 222 of FIG. 5A (illustrated in FIGS. 5A and 5B using connector B).

If, at step 228, it is determined that no further tag measurements would be available for leading to a sufficiently high FFC-tag association probability, the network arbitrator component 148 marks the FFC as an unknown object (step 232). As described before, unknown objects are omitted, or alternatively, tracked up to a certain extent. The process then goes to step 240.

Although not shown in FIGS. 5A and 5B, the process 200 may be terminated upon receiving a command from an administrative user.

Figure 6A:
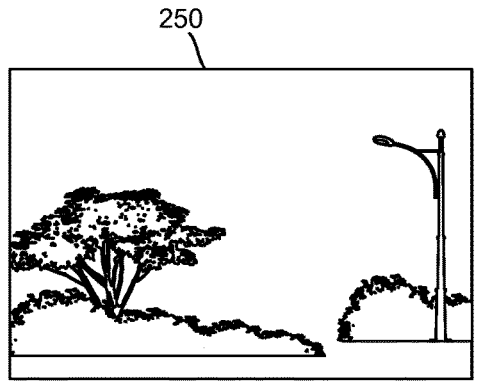
FIGS. 6A to 6D show steps of an example of establishing and tracking an FFC-tag association following the process of FIGS. 5A and 5B.
Figure 6B:
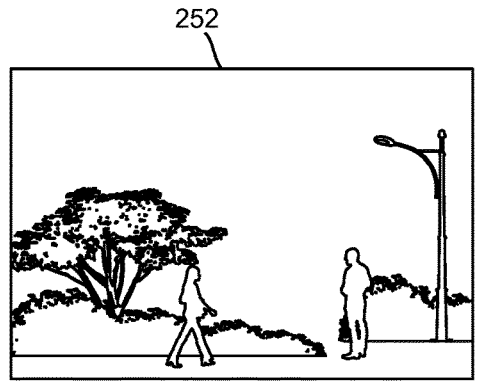
Figure 6C:
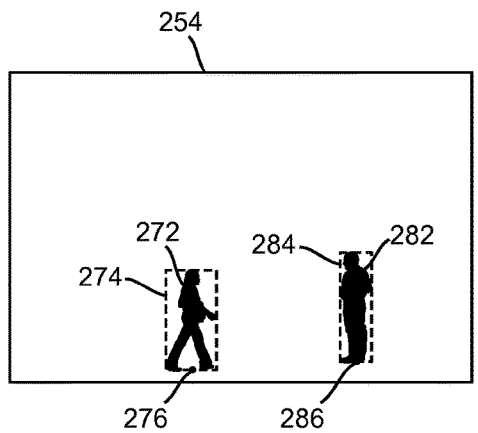
Figure 6D:
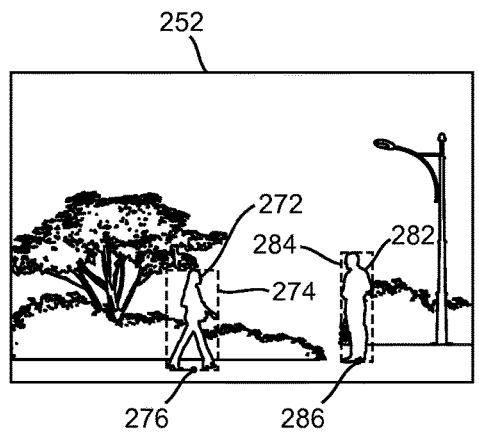

FIGS. 6A to 6D show an example of establishing and tracking an FFC-tag association following the process 200. As shown, the computer vision processing block 146 maintains a background image 250 of an imaging device. When an image 252 of captured by the imaging device is received, the computer vision processing block 146 calculates a difference image 254 using suitable image processing technologies. As shown in FIG. 6C, two FFCs 272 and 282 are detected from the difference image 254. The two FFCs 272 and 282 are bounded by their respective bounding boxes 274 and 284. Each bounding box 274, 284 comprises a respective BBTP 276, 286. FIG. 6D shows the captured image 252 with detected FFCs 272 and 282 as well as their bounding boxes 274 and 284 and BBTPs 276 and 286.

When processing the FFC 272, the image analysis of image 252 and historical images show that the FFC 272 is moving by a walking motion and the FFC 282 is stationary. As the image 252 comprises two FFCs 272 and 282, FFC-tag association cannot be established by using the image analysis results only.

Two tag devices 114A and 114B have been registered in the system 100, neither of which have been associated with an FFC. Therefore, both tag devices 114A and 114B are candidate tag devices.

The network arbitrator component 148 then requests the candidate tag devices 114A and 114B to measure certain characteristics of the motion of their corresponding mobile objects. After receiving the tag measurements from tag devices 114A and 114B, the network arbitrator component 148 compares the motion tag measurements of each candidate tag device with that obtained from the image analysis to calculate the probability that the object is undergoing a walking activity. One of the candidate tag devices, e.g., tag device 114A, may obtain a motion tag measurement leading to an FFC-tag association probability higher than the predefined probability threshold. The network arbitrator component 148 then associates FFC 272 with tag device 114A and store this FFC-tag association in the tracking table 182. Similarly, the network arbitrator component 148 determines that the motion tag measurement from tag device 114B indicates that its associated mobile object is in a stationary state, and thus associates tag device 114B with FFC 284. The computer vision processing block 146 tracks the FFCs 272 and 282.

With the process 200, the system 100 tracks the FFCs that are potentially moving objects in the foreground. The system 100 also tracks objects disappearing from the foreground, i.e., tag devices not associated with any FFC, which implies that the corresponding mobile objects may be outside the FOV of any imaging device 104, e.g., in a washroom area or private office where there is no camera coverage. Such disappearing objects, i.e., those corresponding to tag devices with no FFC-tag association, are still tracked based on tag measurements they provide to the computer cloud 108 such as RSS measurements.

Disappearing objects may also be those who have become static for an extended period of time and therefore part of the background and hence not part of a bounding box 162. It is usually necessary for the system 100 to track all tag devices 114 because in many situations only a portion of the tag devices can be associated with FFCs. Moreover, not all FFCs or foreground objects can be associated with tag devices. The system may track these FFCs based on image analysis only, or alternatively, ignore them.

With the process 200, an FFC may be associated with one or more tag device 114. For example, when a mobile object 112C having a tag device 114C is sufficiently distant from other mobile objects in the FOV of an imaging device, the image of the mobile object 112C as an FFC is distinguishable from other mobile objects in the captured images. The FFC of the mobile object 112C is then associated with the tag device 114C only.

However, when a group of mobile objects 112D are close to each one, e.g., two persons shaking hands, they may be detected as one FFC in the captured images. In this case, the FFC is associated with all tag devices of the mobile objects 112D.

Similarly, when a mobile object 112E is partially or fully occluded in the FOV of an imaging device by one or more mobile objects 112F, the mobile objects 112E and 112F may be indistinguishable in the captured images, and be detected as one FFC. In this case, the FFC is associated with all tag devices of the mobile objects 112E and 112F.

Those skilled in the art understand that an FFC associated with multiple tag devices is usually temporary. Any ambiguity caused therefrom may be automatically resolved in subsequent mobile object detection and tracking when the corresponding mobile objects are separated in the FOV of the imaging devices.

Figure 7:
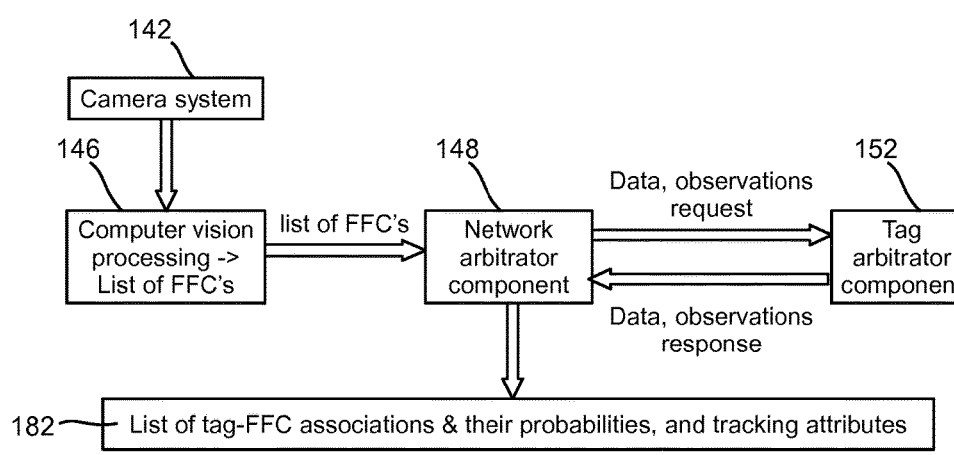
FIG. 7 is a schematic diagram showing the main function blocks of the system of FIG. 1 and the data flows therebetween, according to an alternative embodiment.

While the above has described a number of embodiments, those skilled in the art appreciate that other alternative embodiments are also readily available. For example, although in above embodiments, data of FFC-tag associations in the tracking table 182 is fed back to the computer vision processing block 146 for facilitating the computer vision processing block 146 to better detect the FFC in subsequent images (FIG. 4), in an alternative embodiment, no data of FFC-tag associations is fed back to the computer vision processing block 146. FIG. 7 is a schematic diagram showing the main function blocks of the system 100 and the data flows therebetween in this embodiment. The object tracking process in this embodiment is the same as the process 200 of FIGS. 5A and 5B, except that, in this embodiment, the process does not have step 238 of FIG. 5B.

In above embodiments, the network arbitrator component 148, when needing further tag measurements for establishing FFC-tag association, only checks if the candidate tag devices 114 can provide further tag measurements helpful in leading to a sufficiently high FFC-tag association probability (step 228 of FIG. 5B). In an alternative embodiment, when needing further tag measurements of a first mobile object, the network arbitrator component 148 can request tag measurements from the tag devices near the first mobile object, or directly use the tag measurements if they are already sent to the computer cloud 108 (probably previously requested for tracking other mobile objects). The tag measurements obtained from these tag devices can be used as inference to the location of the first mobile object. This may be advantageous, e.g., for saving tag device power consumption if the tag measurements of the nearby tag devices are already available in the computer cloud, or when the battery power of the tag device associated with the first object is low.

In another embodiment, the tag devices constantly send tag measurements to the computer cloud 108 without being requested.

In another embodiment, each tag device attached to a non-human mobile object, such as a wheelchair, a cart, a shipping box or the like, stores a Type-ID indicating the type of the mobile object. In this embodiment, the computer cloud 108, when requesting tag measurements, can request tag devices to provide their stored Type-ID, and then uses object classification to determine the type of the mobile object, which may be helpful for establishing FFC-tag association. Of course, alternatively, each tag device associated with a human object may also store a Type-ID indicating the type, i.e., human, of the mobile object.

In another embodiment, each tag device is associated with a mobile object, and the association is stored in a database of the computer cloud 108. In this embodiment, when ambiguity occurs in the visual tracking of mobile objects, the computer cloud 108 may request tag devices to provide their ID, and checks the database to determine the identity of the mobile object for resolving the ambiguity.

In another embodiment, contour segmentation can be applied in detecting FFCs. Then, motion of the mobile objects can be detected using suitable classification methods. For example, for individuals, after detecting an FFC, the outline of the detected FFC can be characterized to a small set of features based on posture for determining if the mobile object is standing or walking. Furthermore, the motion detected over a set of sequential image frames can give rise to an estimate of the gait frequency, which may be correlated with the gait determined from tag measurements.

In above embodiments, the computer cloud 108 is deployed at the site 102, e.g., at an administration location thereof. However, those skilled in the art appreciate that, alternatively, the computer cloud 108 may be deployed at a location remote to the site 102, and communicates with imaging devices 104 and tag devices 114 via suitable wired or wireless communication means. In some other embodiments, a portion of the computer cloud 108, including one or more server computers 110 and necessary network infrastructure, may be deployed on the site 102, and other portions of the computer cloud 108 may be deployed remote to the site 102. Necessary network infrastructure known in the art is required for communication between different portions of the computer cloud 108, and for communication between the computer cloud 108 and the imaging devices 104 and tag devices 114.

Implementation

The above embodiments show that the system and method disclosed herein are highly customizable, providing great flexibility to a system designer to implement the basic principles ye design the system in a way as desired, and adapt to the design target that the designer has to meet and to the resources that the designer has, e.g., available sensors in tag devices, battery capacities of tag devices, computational power of tag devices and the computer cloud, and the like. In the following, several aspects in implementing the above described system are described.

I. Imaging Device Frame Rates

In some embodiments, the imaging devices 104 may have different frame rates. For imaging devices with higher frame rates than others, the computer cloud 108 may, at step 206 of the process 200, reduce their frame rate by time-sampling images captured by these imaging devices, or by commanding these imaging devices to reduce their frame rates. Alternatively, the computer cloud 108 may adapt to the higher frame rates thereof to obtain better real-time tracking of the mobile objects in the FOVs of these imaging devices.

II. Background Images

The computer cloud 108 stores and periodically updates a background image for each imaging device. In one embodiment, the computer cloud 108 uses a moving average method to generate the background image for each imaging device. That is, the computer cloud 108 periodically calculates the average of N consecutively captured images to generate the background image. While the N consecutively captured images may be slightly different to each other, e.g., having different lighting, foreground objects and the like, the differences between these images tend to disappear in the calculated background image when N is sufficiently large.

III. FFC Detection

Figure 8:
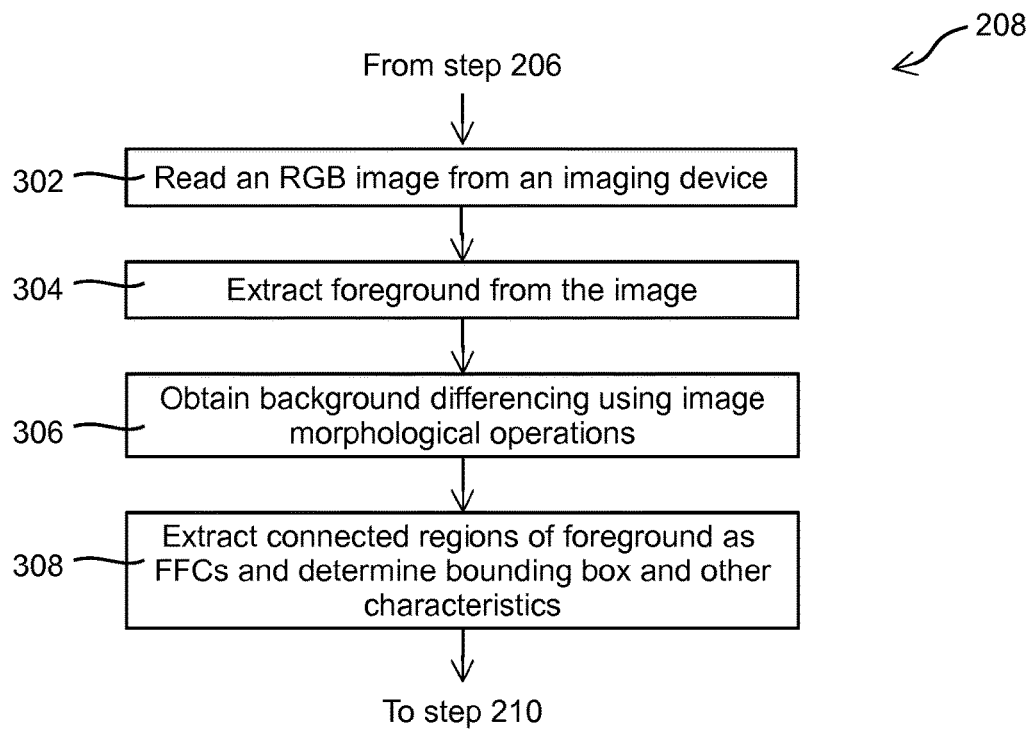
FIG. 8 is a flowchart showing the detail of FFC detection, according to one embodiment.

In implementing step 208 of detecting FFCs, the computer vision processing block 146 may use any suitable imaging processing methods to detect FFCs from captured images. For example, FIG. 8 is a flowchart showing the detail of step 208 in one embodiment, which will be described together with the examples of FIGS. 9A to 9F.

Figure 9A:
FIGS. 9A to 9F show a visual representation of steps in an example of FFC detection.

At step 302, a captured image is read into the computer vision processing block 146. In this embodiment, the capture image is an RGB color image. FIG. 9A is a line-drawn illustration of a captured color image having two facing individuals as two mobile objects.

At step 304, the captured image is converted to a greyscale image (current image) and a difference image is generated by subtracting the background image, which is also a greyscale image in this embodiment, from the current image on a pixel by pixel basis. The obtained difference image is converted to a binary image by applying a suitable threshold, e.g., pixel value being equal to zero or not.

Figure 9B:
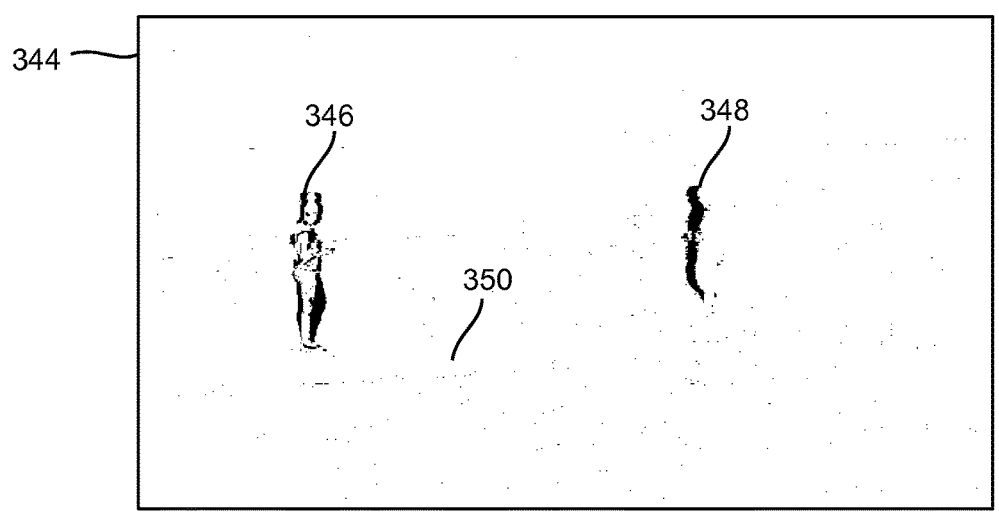

FIG. 9B shows the difference image 344 obtained from the captured image 342. As can be seen, two images 346 and 348 of the mobile objects in the FOV of the imaging device have been isolated from the background. However, the difference image 344 has imperfections. For example, images 346 and 348 of the mobile objects are incomplete as some regions of the mobile objects appear in the image with colors or grey intensities insufficient for differentiating from the background. Moreover, the difference image 344 also comprises salt and pepper noise pixels 350.

At step 306, the difference image is processed using morphological operations to compensate imperfections. The morphological operations use Morphology techniques that process images based on shapes. The morphological operations apply a structuring element to the input image, i.e., the difference image in this case, creating an output image of the same size. In morphological operations, the value of each pixel in the output image is determined based on a comparison of the corresponding pixel in the input image with its neighbors. Imperfections are then compensated to certain extents.

Figure 9C:
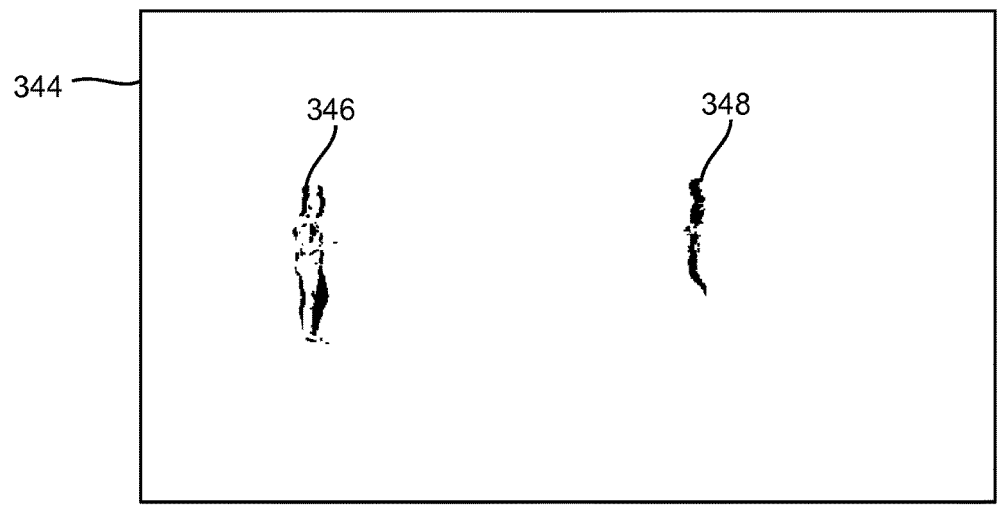

In this embodiment, the difference image 344 is first processed using morphological opening and closing. As shown in FIG. 9C, salt and pepper noise is removed.

Figure 9D:
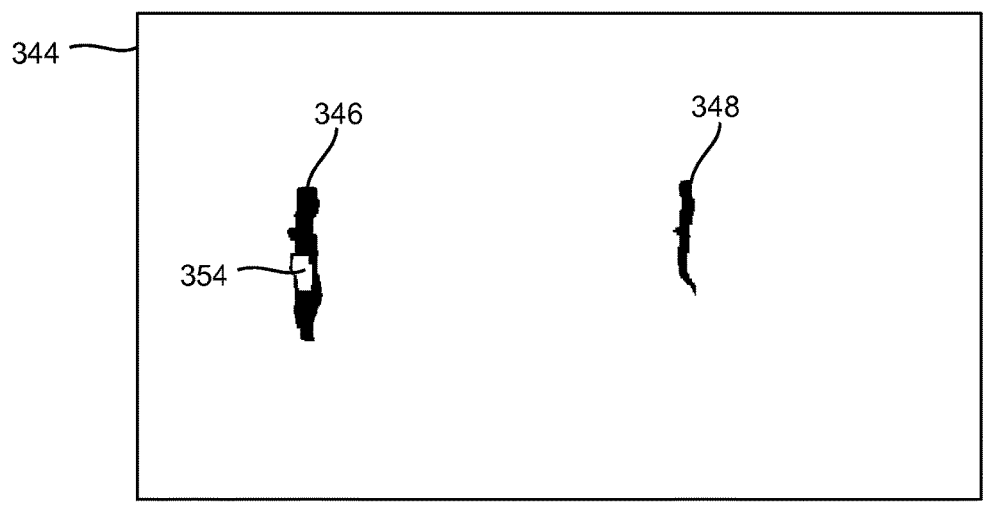

The difference image 344 is then processed using erosion and dilation operations. As shown in FIG. 9D the shapes of the mobile object images 346 and 348 are improved. However, the mobile object image 346 still contains a large internal hole 354.

After erosion and dilation operations, a flood fill operation is applied to the difference image 344 to close up any internal holes. The difference image 344 after flood fill operation is shown in FIG. 9E.

Figure 9E:
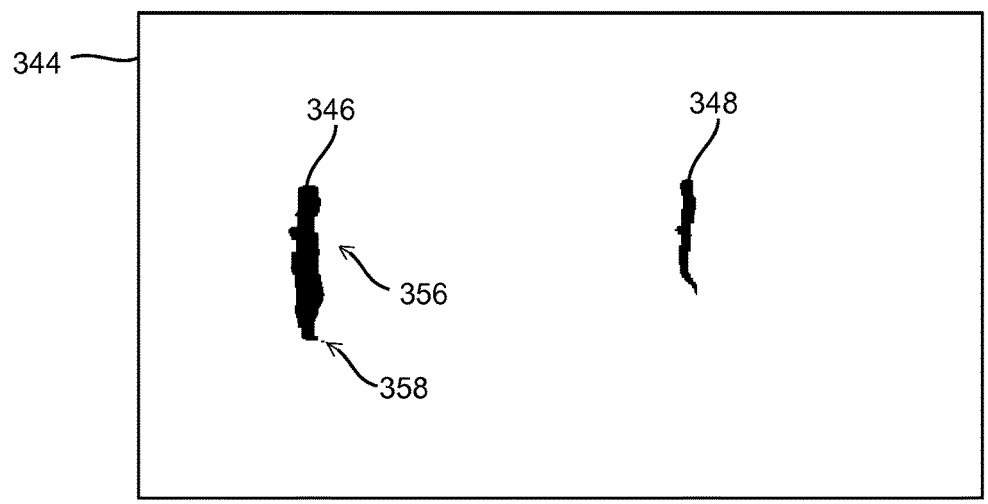

Also shown in FIG. 9E, the processed difference image 344 also comprises small spurious FFCs 356 and 358. By applying suitable size criteria such small spurious FFCs 356 and 358 are rejected as their sizes are smaller than a predefined threshold. Large spurious FFCs, on the other hand, may be retained as FFCs. However, they may be omitted later for not being able to be associated with any tag device. In some cases, a large spurious FFC, e.g., a shopping cart, may be associated with another FFC, e.g., a person, already associated with a tag device, based on similar motion between the two FFCs over time.

Figure 9F:
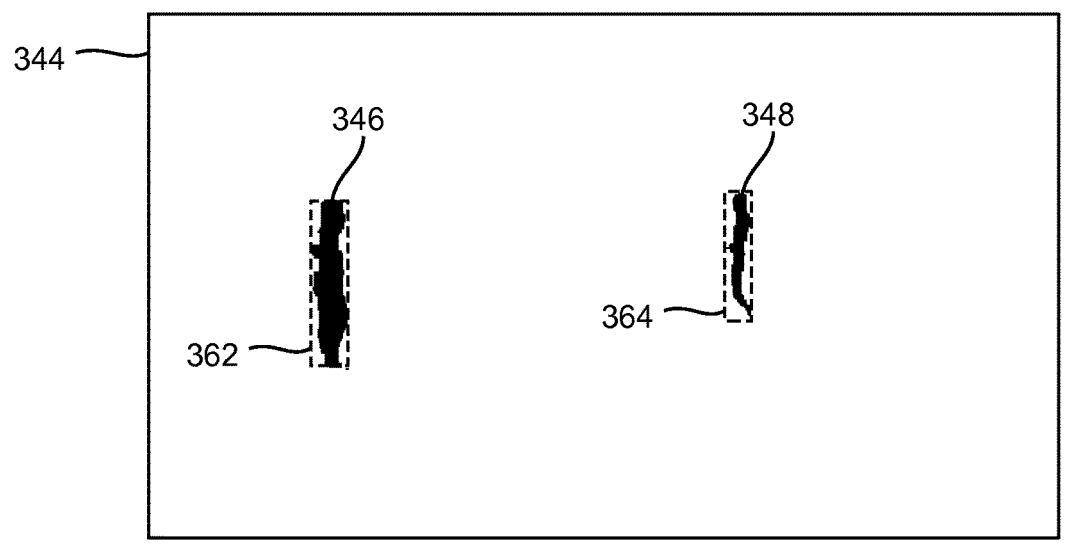

Referring back to FIG. 8, at step 308, the computer vision processing block 146 extracts FFCs 346 and 348 from processed difference image 344, each FFC 346, 348 being a connected region in the difference image 344 (see FIG. 9F). The computer vision processing block 146 creates bounding boxes 356 and 358 and their respective BBTPs (not shown) for FFCs 346 and 348, respectively. Other FFC characteristics as described above are also determined.

After extracting FFCs from the processed difference image, the process then goes to step 210 of FIG. 5A.

The above process converts the captured color images to greyscale images for generating greyscale difference images and detecting FFCs. Those skilled in the art appreciate that in an alternative embodiment, color difference images may be generated for FFC detection by calculating the difference on each color channel between the captured color image and the background color image. The calculated color channel differences are then weighted and added together to generate a greyscale image for FFC detection.

Alternatively, the calculated color channel differences may be enhanced by, e.g., first squaring the pixel values in each color channel, and then adding together the squared values of corresponding pixels in all color channels to generate a greyscale image for FFC detection.

IV. Shadows

Figure 10:
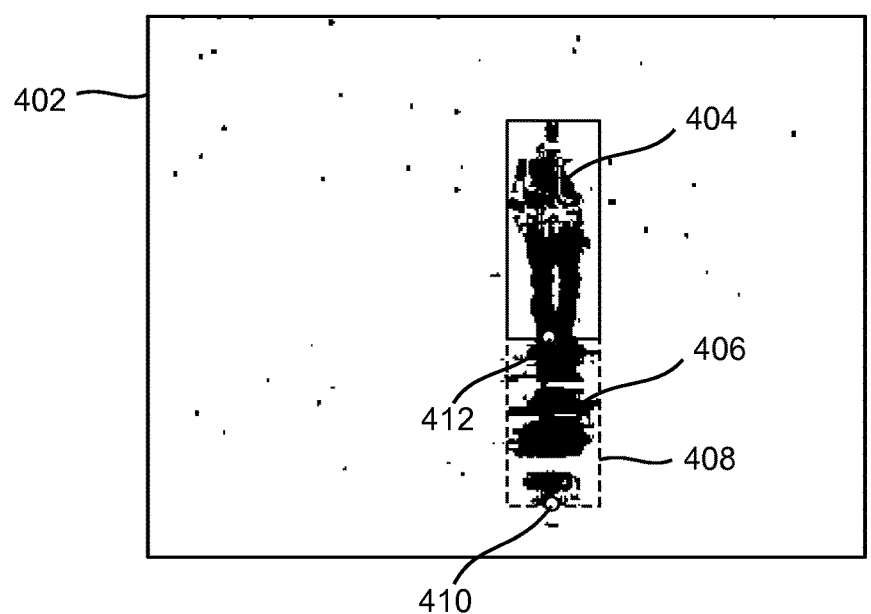
FIG. 10 shows a visual representation of an example of a difference image wherein the mobile object captured therein has a shadow.

It is well known that shadow may be cast adjacent an object in some lighting conditions. Shadows of a mobile object captured in an image may interfere with FFC detection, the FFC centroid determination and BBTP determination. For example, FIG. 10 shows a difference image 402 having the image 404 of a mobile object, and the shadow 406 thereof, which is shown in the image 402 under the mobile object image 404. Clearly, if both the mobile object image 404 and the shadow 406 were detected as an FFC, an incorrect bounding box 408 would be determined, and the BBTP would be mistakenly determined at a much lower position 410, compared to the correct BBTP location 412. As a consequence, the mobile object would be mapped to a wrong location in the 3D coordinate system of the site, being much closer to the imaging device.

Various methods may be used to mitigate the impact of shadow in detecting FFC and in determining the bounding box, centroid and BBTP of the FFC. For example, in one embodiment, one may leverage the fact that the color of shadows are usually different than that of the mobile object, and filters different color channels of a generated color difference image to eliminate the shadow or reduce the intensity thereof. This method would be less effective if the color of the mobile object is poorly distinguishable from the shadow.

In another embodiment, the computer vision processing block 146 considers the shadow as a random distribution, and analyses shadows in captured images to differentiate shadows from mobile object images. For example, for an imaging device facing a well-lit environment, where the lighting is essentially diffuse and that all the background surfaces are Lambertian surfaces, the shadow cast by a mobile object consists of a slightly reduced intensity in a captured image comparing to that of the background areas in the image, as the mobile object only blocks a portion of the light that is emanating from all directions. The intensity reduction is smaller with the shadow point being further from the mobile object. Hence the shadow will have an intensity distribution scaled with the distance between shadow points and the mobile object while the background has a deterministic intensity value. As the distance from the mobile object to the imaging device is initially unknown, the intensity of the shadow can be represented as a random distribution. The computer vision processing block 146 thus analyses shadows in images captured by this imaging device using a suitable random process method to differentiate shadows from mobile object images.

Some imaging devices may face an environment having specular light sources and/or that the background surfaces are not Lambertian surfaces. Shadows in such environment may not follow the above-mentioned characteristics of the diffuse lighting. Moreover, lighting may change with time, e.g., due to sunlight penetration of room, electrical lights turned off or on, doors opened or closed, and the like. Light changes will also affect the characteristics of shadows.

In some embodiments, the computer vision processing block 146 considers the randomness of the intensities of both the background and the shadow in each color channel, and considers that generally the background varies slowly and the foreground, e.g., a mobile object, varies rapidly. Based on such considerations, the computer vision processing block 146 uses a pixel-wise high pass temporal filtering to filtering out shadows of mobile objects.

In some other embodiments, the computer vision processing block 146 determines a probability density function (PDF) of the background to adapt to the randomness of the lighting effects. The intensity of background and shadow components follows a mixture of gaussians (MoG) model, and a foreground, e.g., a mobile object, is then discriminated probabilistically. As there are a large number of neighboring pixels making up the foreground region, then a spatial MoG representation of the PDF of the foreground intensity can be calculated for determining how different it is from the background or shadow.

In some further embodiments, the computer vision processing block 146 weights and combines the pixel-wise high pass temporal filtering and the spatial MoG models to determine if a given pixel is foreground, e.g., belonging to a mobile object, with higher probability.

In still some further embodiments, the computer vision processing block 146 leverages the fact that, if a shadow is not properly eliminated, the BBTP of an FFC shifts from the correct location in the difference images and may shift with the change of lighting. With perspective mapping, such a shift of BBTP in the difference images can be mapped to a physical location shift of the corresponding mobile object in the 3D coordinate system of the site. The computer vision processing block 146 calculates the physical location shift of the corresponding mobile object in the physical world, and requests the tag device to make necessary measurement using, e.g., the IMU therein. The computer vision processing block 146 checks if the calculated physical location shift of the mobile object is consistent with the tag measurement, and compensates for the location shift using the tag measurement.

V. Perspective Mapping

As described above, at step 210 of FIG. 5A, the extracted FFCs are mapped to the 3D physical-world coordinate system of the site 102.

In one embodiment, the map of the site is partitioned into one or more horizontal, planes $L_1, \ldots, L_n$, each at a different elevation. In other words, in the 3D physical world coordinate system, points in each plane have the same z-coordinate. However, points in different planes have different z-coordinates. The FOV of each imaging device covers one or more horizontal planes.

A point $(x_{w,i}, y_{w,i}, 0)$ on a plane $L_i$ at an elevation $Z_i=0$ and falling within the FOV of an imaging device can be mapped to a point $(x_c, y_c)$ in the images captured by the imaging device:

$$\begin{bmatrix} f_x \\ f_y \\ f_v \end{bmatrix} = H_i \begin{bmatrix} x_{w,i} \\ y_{w,i} \\ 1 \end{bmatrix}, \quad (1)$$

$$x_c = \frac{f_x}{f_v}, \quad (2)$$

$$y_c = \frac{f_y}{f_v}, \quad (3)$$

wherein $$H_i = \begin{bmatrix} H_{11,i} & H_{12,i} & H_{13,i} \\ H_{21,i} & H_{22,i} & H_{23,i} \\ H_{31,i} & H_{32,i} & H_{33,i} \end{bmatrix} \quad (4)$$

is a 9-by-9 perspective-transformation matrix.

The above relationship between point $(x_{w,i}, y_{w,i}, 0)$ in physical world and point $(x_c, y_c)$ in a captured image may also be written as:

$$\begin{cases} H_{31,i}x_c x_{w,i} + H_{32,i}x_c y_{w,i} + H_{33,i}x_c = H_{11,i}x_{w,i} + H_{12,i}y_{w,i} + H_{13,i}, \\ H_{31,i}y_c x_{w,i} + H_{32,i}y_c y_{w,i} + H_{33,i}y_c = H_{21,i}x_{w,i} + H_{22,i}y_{w,i} + H_{23,i}. \end{cases} \quad (5)$$

For each imaging device, a perspective-transformation matrix $H_i$ needs to be determined for each plane $L_i$ falling within the FOV thereof. The computer vision processing block 146 uses a calibration process to determine a perspective-transformation matrix for each plane in the FOV of each imaging device.

In particular, for a plane $L_i$, $1 \leq i \leq n$, falling within the FOV of an imaging device, the computer vision processing block 146 first selects a set of four (4) or more points on plane $L_i$ with known 3D physical-world coordinates, such as corners of a floor tile, corners of doors and/or window openings, of which no three points are in the same line, and sets their z-values to zero. The computer vision processing block 146 also identifies the set of known points from the background image and determines their 2D coordinates therein. The computer vision processing block 146 then uses a suitable optimization method such as a singular value decomposition (SVD) method to determine a perspective-transformation matrix $H_i$ for plane $L_i$ in the FOV of the imaging device. After determining the perspective-transformation matrix $H_i$, a point on plane $L_i$ can be mapped to a point in an image, or a point in an image can be mapped to a point on plane $L_i$ by using equation (5).

The calibration process may be executed for an imaging device only once at the setup of the system 100, periodically such as during maintenance, as needed such as when repairing or replacing the imaging device. The calibration process is also executed after the imaging device is reoriented or zoomed and focused.

During mobile object tracking, the computer vision processing block 146 detects FFCs from each captured image as described above. For each detected FFC, the computer vision processing block 146 determines coordinates $(x_c, y_c)$ of the BBTP of the FFC in the captured image, and determines the plane, e.g., $L_k$, that the BBTP of the FFC falls within, with the assumption that the BBTP of the FFC, when mapping to the 3D physical world coordinate system, is on plane $L_k$, i.e., the z-coordinate of the BBTP equals to that of plane $L_k$. The computer vision processing block 146 then calculates the coordinates $(x_{w,k}, y_{w,k}, 0)$ of the BBTP in a 3D physical world coordinate system with respect to the imaging device and plane $L_k$ (denoted as a "local 3D coordinate system") using above equation (5), and translate the coordinates of the BBTP into a location $(x_{w,k}+\Delta x, y_{w,k}+\Delta y, z_k)$ in the 3D physical world coordinate system of the site (denoted as the "global 3D coordinate system"), wherein $\Delta x$ and $\Delta y$ are the difference between the origins of the local 3D coordinate system and the global 3D coordinate system, and $z_k$ is the elevation of plane $L_k$.

Figure 11A:
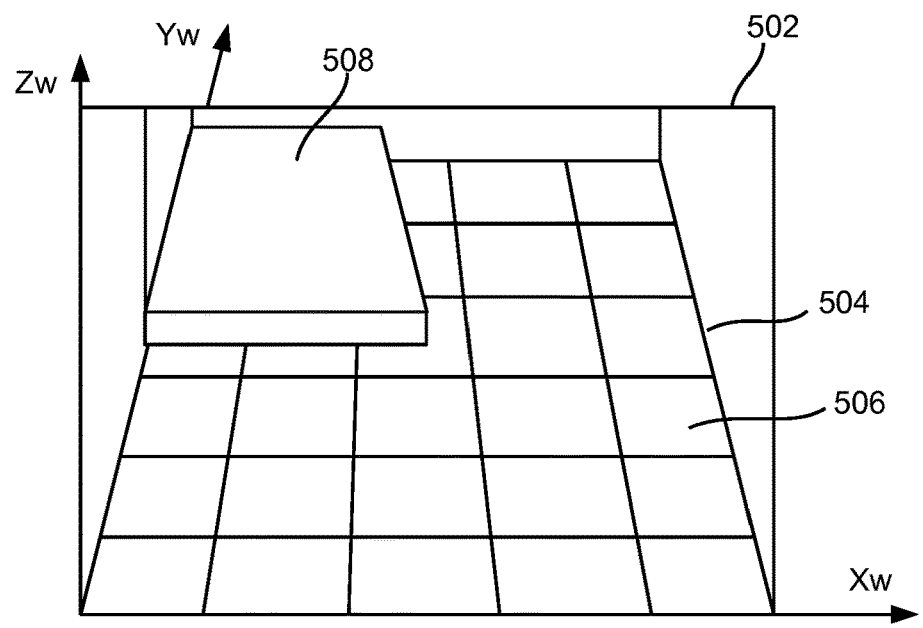
FIG. 11A is a three-dimensional (3D) perspective view of a portion of a site.
Figure 11B:
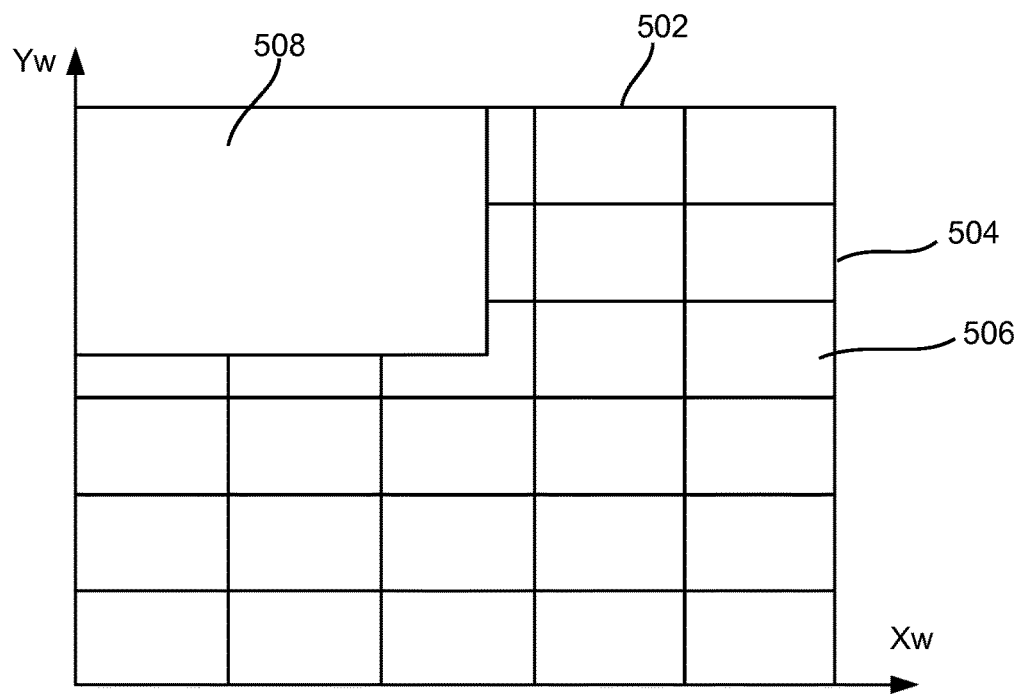
FIG. 11B is a plan view of the site portion of FIG. 11A.

For example, FIG. 11A is a 3D perspective view of a portion 502 of a site 102 falling with the FOV of an imaging device, and FIG. 11B a plan view of the portion 502. For ease of illustration, the axes of a local 3D physical world coordinate system with respect to the imaging device is also shown, with Xw and Yw representing the two horizontal axes and Zw representing the vertical axis. As shown, the site portion 502 comprises a horizontal, planar floor 504 having a plurality of tiles 506, and a horizontal, planar landing 508 at a higher elevation than the floor 504.

Figure 11C:
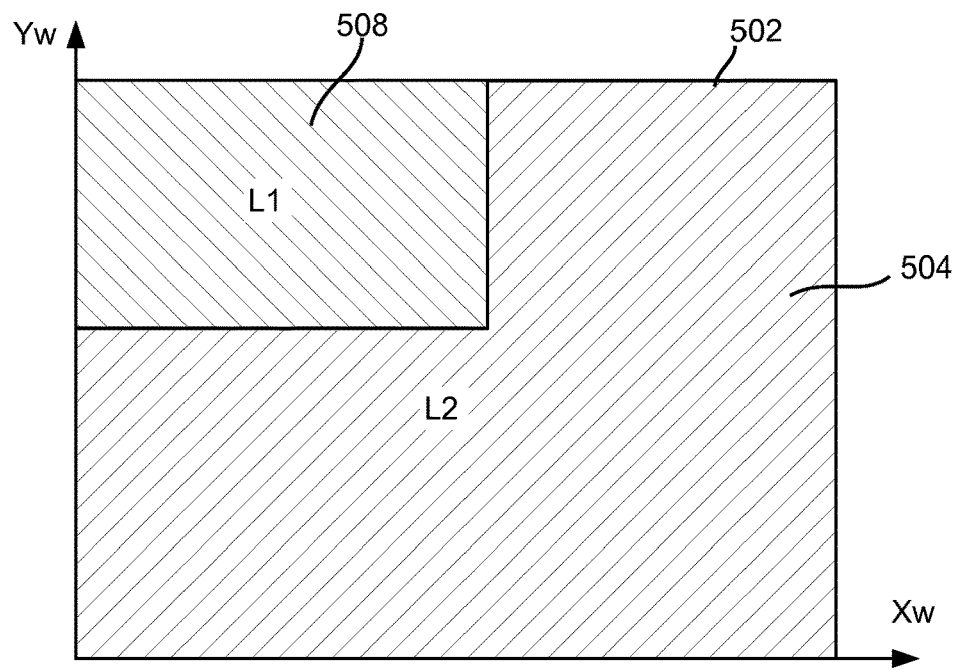
FIGS. 11C and 11D show the partition of the site portion of FIGS. 11B and 11A, respectively.
Figure 11D:
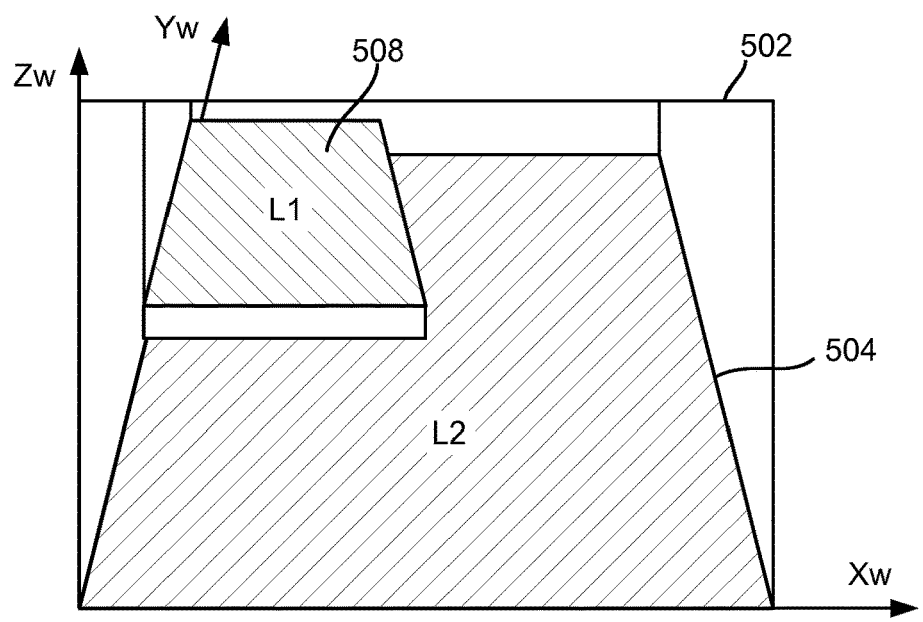

As shown in FIGS. 11C and 11D, the site portion 502 is partitioned into two planes L1 and L2, with plane L2 corresponding to the floor 504 and plane L1 corresponding to the landing 508. Plane L1 has a higher elevation than plane L2.

Figure 11E:
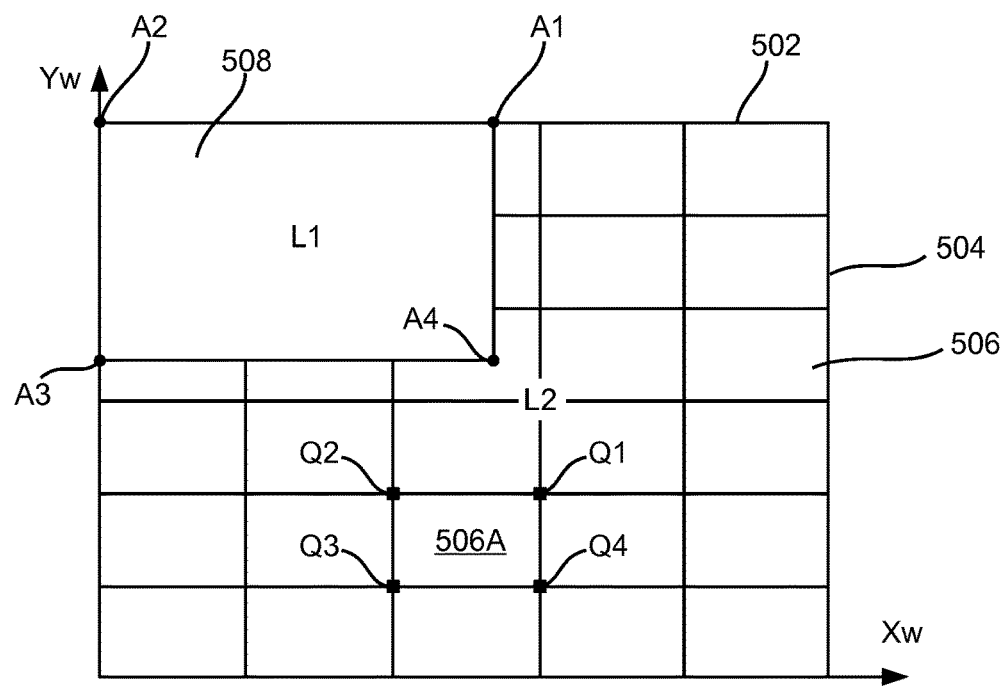
FIGS. 11E and 11F show the calibration processing for establishing perspective mapping between the site portion of FIG. 11A and captured images.
Figure 11F:
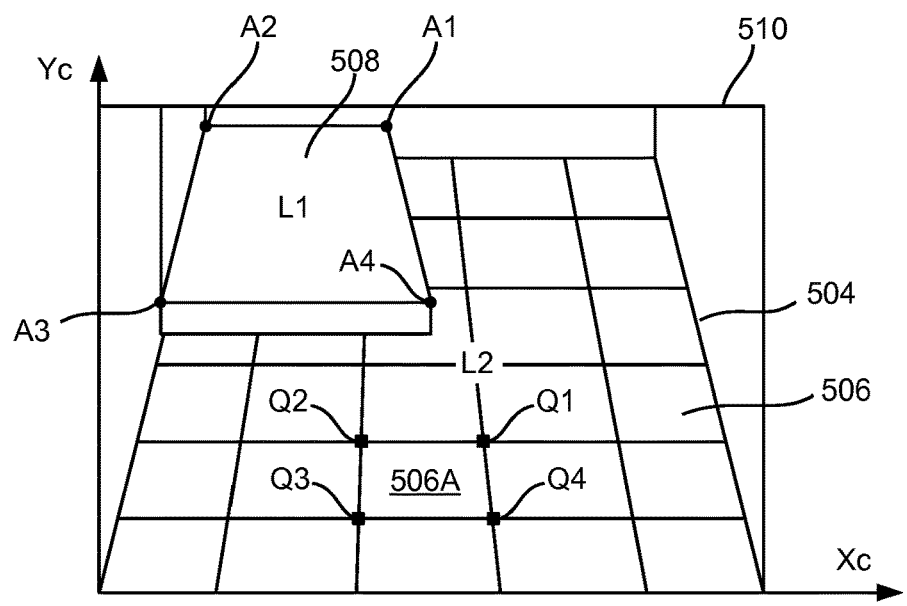

As shown in FIG. 11E, during calibration of the imaging device, the computer vision processing block 146 uses the corners A1, A2, A3 and A4 of the landing 508, whose physical world coordinates $(x_{w1}, y_{w1}, z_{w1})$, $(x_{w2}, y_{w2}, z_{w1})$, $(x_{w3}, y_{w3}, z_{w1})$ and $(x_{w4}, y_{w4}, z_{w1})$, respectively, are known with $z_{w1}$ also being the elevation of plane L1, to determine a perspective-transformation matrix $H_1$ for plane L1 in the imaging device. FIG. 11F shows a background image 510 captured by the imaging device.

As described above, the computer vision processing block 146 set $z_{w1}$ to zero, i.e., set the physical world coordinates of the corners A1, A2, A3 and A4 to $(x_{w1}, y_{w1}, 0)$, $(x_{w2}, y_{w2}, 0)$, $(x_{w3}, y_{w3}, 0)$ and $(x_{w4}, y_{w4}, 0)$, respectively, determines their image coordinates $(x_{c1}, y_{c1})$, $(x_{c2}, y_{c2})$, $(x_{c3}, y_{c3})$ and $(x_{c4}, y_{c4})$, respectively, in the background image 510, and then determines a perspective-transformation matrix $H_1$ for plane L1 in the imaging device by using these physical world coordinates $(x_{w1}, y_{w1}, 0)$, $(x_{w2}, y_{w2}, 0)$, $(x_{w3}, y_{w3}, 0)$ and $(x_{w4}, y_{w4}, 0)$, and corresponding image coordinates $(x_{c1}, y_{c1})$, $(x_{c2}, y_{c2})$, $(x_{c3}, y_{c3})$ and $(x_{c4}, y_{c4})$.

Also shown in FIGS. 11E and 11F, the computer vision processing block 146 uses the four corners Q1, Q2, Q3 and Q4 of a tile 506A to determine a perspective-transformation matrix $H_2$ for plane L2 in the imaging device in a similar manner.

Figure 12A:
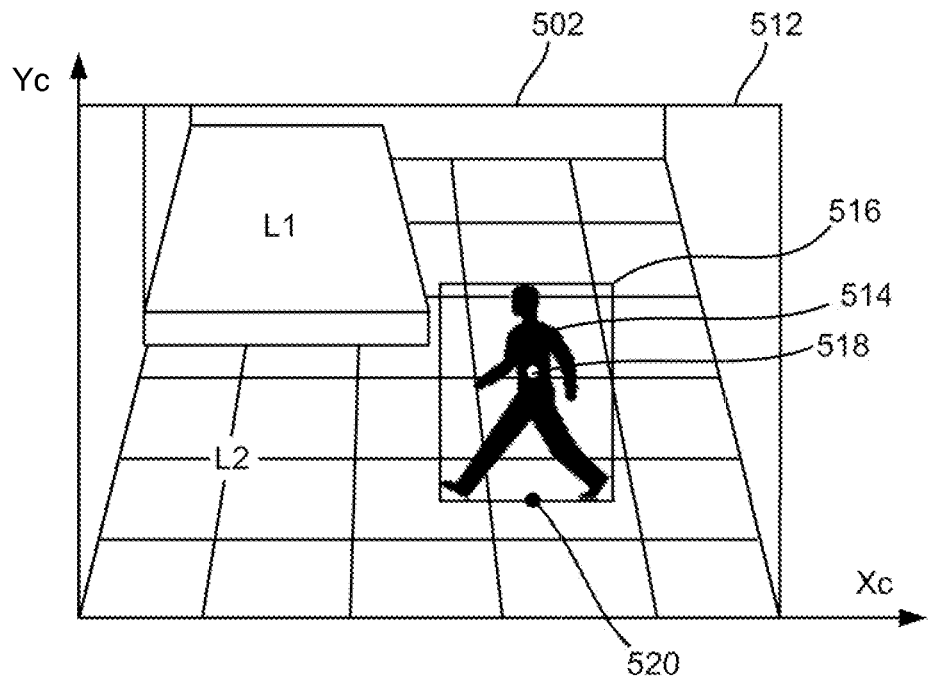
FIG. 12A shows a captured image of the site portion of FIG. 11A, the captured image having an FFC of a person detected therein.
Figure 12B:
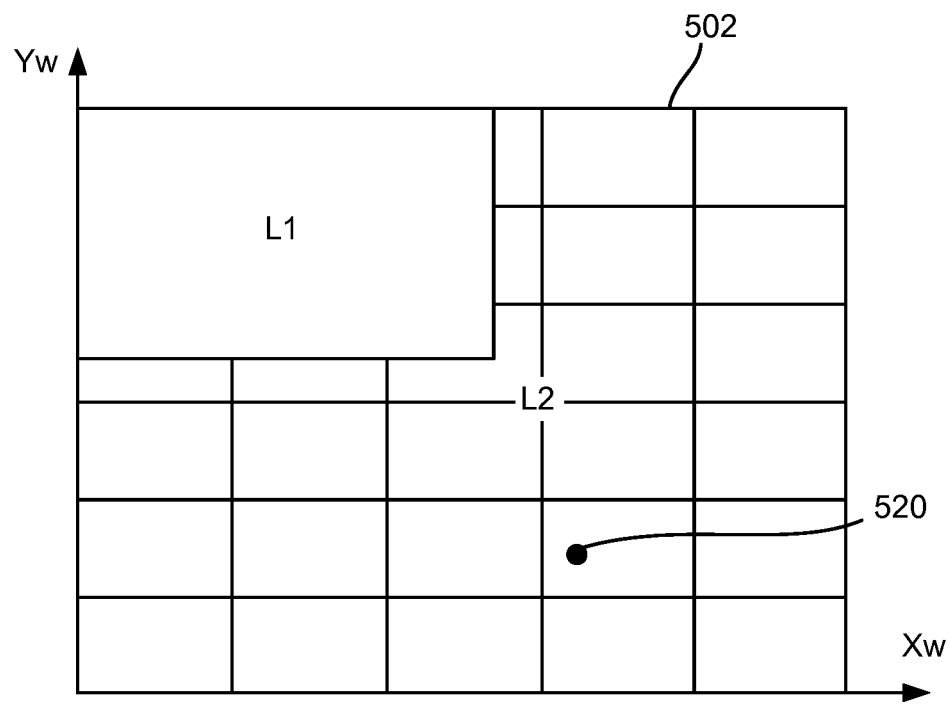
FIG. 12B is a plan view of the site portion of FIG. 11A with the FFC of FIG. 12A mapped thereto.
Figure 12C:
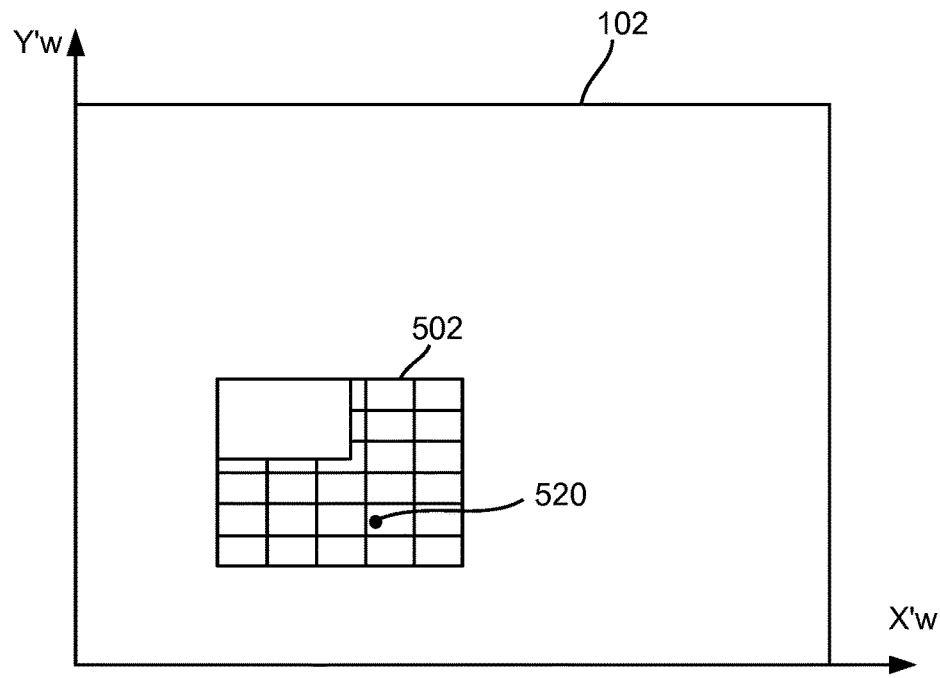
FIG. 12C shows a sitemap having the site portion of FIG. 11A and the FFC of FIG. 12A mapped thereto.

After determining the perspective-transformation matrices $H_1$ and $H_2$, the computer vision processing block 146 starts to track mobile objects in the site 102. As shown in FIG. 12A, the imaging device captures an image 512, and the computer vision processing block 146 identifies therein an FFC 514 with a bounding box 516, a centroid 518 and a BBTP 520. The computer vision processing block 146 determines that the BBTP 520 is within the plane L2, and then uses equation (5) with the perspective-transformation matrix $H_2$ and the coordinates of the BBTP 520 in the captured image 512 to calculate the x- and y-coordinates of the BBTP 520 in the 3D physical coordinate system of the site portion 502 (FIG. 12B). As shown in FIG. 12C, the computer vision processing block 146 may further translate the calculated x- and y-coordinates of the BBTP 520 to a pair of x- and y-coordinates of the BBTP 520 in the site 102.

VI. FFC Tracking

The network arbitrator component 148 updates FFC-tag association and the computer vision processing block 146 tracks an identified mobile object at step 236 of FIG. 5B. Various mobile object tracking methods are readily available in different embodiments.

For example, in one embodiment, each FFC in captured image stream is analyzed to determine FFC characteristics, e.g., the motion of the FFC. If the FFC cannot be associated with a tag device without the assistance of tag measurements, the network arbitrator component 148 requests candidate tag devices to obtain required tag measurements over a predefined period of time. While the candidate tag devices are obtaining tag measurements, the imaging devices continue to capture images and the FFCs therein are further analyzed. The network arbitrator component 148 then calculates the correlation between the determined FFC characteristics and the tag measurements received from each candidate tag device. The FFC is then associated with the tag device whose tag measurements exhibit highest correlation with the determined FFC characteristics.

Figure 13:
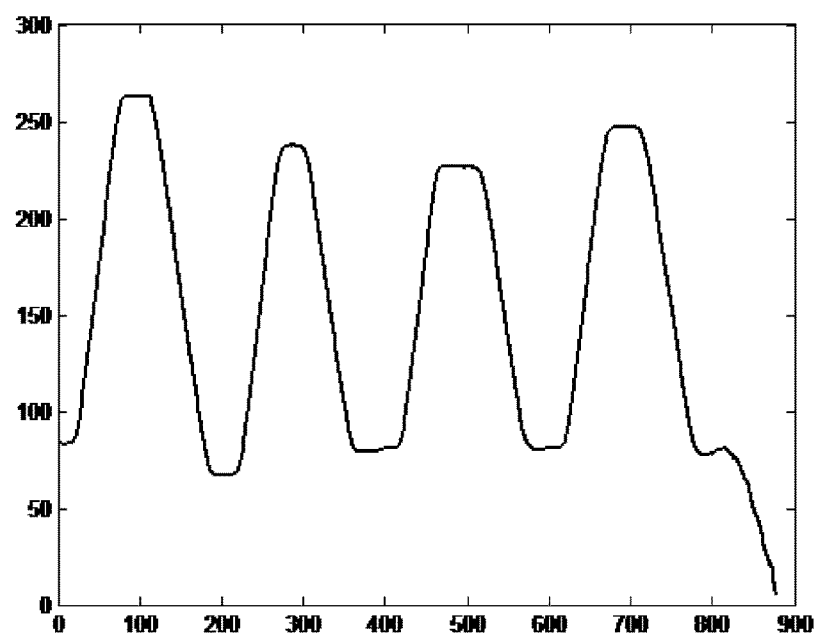
FIG. 13 shows a plot of the x-axis position of a bounding box tracking point (BBTP) of an FFC in captured images, wherein the vertical axis represents the BBTP's x-axis position (in pixel) in captured images, and the horizontal axis represents the image frame index.

For example a human object in the FOV of the imaging device walks for a distance along the x-axis of the 2D image coordinate system, pauses, and then turns around and walks back retracing his path. The person repeats this walking pattern for four times. The imaging device captures the person's walking. FIG. 13 shows a plot of the BBTP x-axis position in captured images.

The vertical axis represents the BBTP's x-axis position (in pixel) in captured images, and the horizontal axis represents the image frame index. It can be expected that, if the accelerometer in the person's tag device records the acceleration measurement during the person's walking, the magnitude of the acceleration will be high when the person is walking, and when the person is stationary, the magnitude of the acceleration is small. Correlating the acceleration measurement with FFC observation made from captured images thus allows the system 100 to establish FFC-tag association with high reliability.

Mapping an FFC from the 2D image coordinate system into the 3D physical world coordinate system may be sensitive to noise and errors in analyzation of captured images and FFC detection. For example, mapping the BBTP and/or the centroid of an FFC to the 3D physical world coordinate system of the site may be sensitive to errors such as the errors in determining the BBTP and centroid due to poor processing of shadows; mobile objects may occlude each other; specular lighting results in shadow distortions that may cause more errors in BBTP and centroid determination. Such errors may cause the perspective mapping from a captured image to the 3D physical world coordinate system of the site noisy, and even unreliable in some situations.

Other mobile object tracking methods using imaging devices exploit the fact that the motions of mobile objects are generally smooth across a set of consecutively captured images, to improve the tracking accuracy.

With the recognition that perspective mapping may introduce errors, in one embodiment, no perspective mapping is conducted and the computer vision processing block 146 tracks FFCs in the 2D image coordinate system. The advantage of this embodiment is that the complexity and ambiguities of the 2D to 3D perspective mapping is avoided. However, the disadvantage is that the object morphing as the object moves in the camera FOV may give rise to errors in object tracking. Modelling object morphing may alleviate the errors caused therefrom, but it requires additional random variables for unknown parameters in the modelling of object morphing or additional variables as ancillary state variables, increasing the system complexity.

In another embodiment, the computer vision processing block 146 uses an extended Kalman filter (EKF) to track mobile objects using the FFCs detected in the captured image streams. When ambiguity occurs, the computer vision processing block 146 requests candidate tag devices to provide tag measurements to resolve the ambiguity. In this embodiment, the random state variables of the EKF are the x- and y-coordinates of the mobile object in the 3D physical world coordinate system following a suitable random motion model such as a random walk model if the mobile object is in a relatively open area, or a more deterministic motion model with random deviation around a nominal velocity if the mobile object is in a relatively directional area, e.g., as a hallway.

Following the EKF theory, observations are made on discrete time steps, each time step corresponds to a captured image. Each observation is the BBTP of the corresponding FFC in a captured image. In other words, the x- and y-coordinates of the mobile object in the 3D physical world coordinate system are mapped to the 2D image coordinate system, and the compared with the BBTP using EKF for predicting the motion of the mobile object.

Mathematically, the random state variables, collectively denoted as a state vector, for the n-th captured image of a set of consecutively captured images is:

$$s_n = [x_{w,n}, y_{w,n}]^T, \quad (6)$$

where [●] represents a matrix, and [●]$^T$ represents matrix transpose. The BBTP of corresponding FFC is thus the observation of $s_n$ in captured images.

In the embodiment that the motion of the mobile object is modelled as random walk, the movement of each mobile object is modelled as an independent first order Markov process with a state vector of $s_n$. Each captured image corresponds to an iteration of the EKF, wherein a white or Gaussian noise is added to each component $x_{w,n}$, $y_{w,n}$ of $s_n$. The state vector $s_n$ is then modelled based on a linear Markov Gaussian model as:

$$s_n = As_{n-1} + Bu_n, \quad (7)$$

with and $u_n$ being a Gaussian vector with the update covariance of $$Q_u = E[u_n u_n^T] = \begin{bmatrix} \sigma_u^2 & 0 \\ 0 & \sigma_u^2 \end{bmatrix}. \quad (8)$$

In other words, the linear Markov Gaussian model may be written as:

$$\begin{cases} x_{w,n} = x_{w,n-1} + u_{x,n} \\ y_{w,n} = y_{w,n-1} + u_{y,n} \end{cases} \quad (9)$$

where $$\begin{bmatrix} u_{x,n} \\ u_{y,n} \end{bmatrix} \sim N\left(\begin{bmatrix} 0 \\ 0 \end{bmatrix}, \begin{bmatrix} \sigma_u^2 & 0 \\ 0 & \sigma_u^2 \end{bmatrix}\right), \quad (10)$$

i.e., each of $u_{x,n}$ and $u_{y,n}$ is a zero-mean normal distribution with a standard deviation of $\sigma_u$.

Equation (7) or (9) gives the state transition function. The values of matrix A and B in Equation (7) depends on the system design parameters and the characteristics of the site 102. In this embodiment, $$A = B = \begin{bmatrix} 1 & 0 \\ 0 & 1 \end{bmatrix}, \quad (11)$$

The state vector $s_n$ is mapped to a position vector $[x_{c,n}, y_{c,n}]^T$ in the 2D image coordinate system of the capture image using perspective mapping (equations (1) to (3)), i.e., $$\begin{bmatrix} f_{x,n} \\ f_{y,n} \\ f_{v,n} \end{bmatrix} = H \begin{bmatrix} x_{w,n} \\ y_{w,n} \\ 1 \end{bmatrix}, \quad (12)$$

$$x_{c,n} = \frac{f_{x,n}}{f_{v,n}}, \quad (13)$$

$$y_{c,n} = \frac{f_{y,n}}{f_{v,n}}, \quad (14)$$

Then, the observation, i.e., the position of the BBTP in the 2D image coordinate system, can be modelled as:

$$z_n = h(s_n) + w_n, \quad (15)$$

where $z_n = [z_1, z_2]^T$ is the coordinates of the BBTP with $z_1$ and $z_2$ representing the x- and y-coordinates thereof, $$h(s_n) = \begin{bmatrix} h_x(s_n) \\ h_y(s_n) \end{bmatrix} = \begin{bmatrix} x_{c,n} \\ y_{c,n} \end{bmatrix} = \begin{bmatrix} f_{x,n}/f_{v,n} \\ f_{y,n}/f_{v,n} \end{bmatrix} \quad (16)$$

is a nonlinear perspective mapping function, which may be approximated using a first order Talylor series thereof, and $$w_n = \begin{bmatrix} w_{x,n} \\ w_{x,n} \end{bmatrix} \sim N\left(\begin{bmatrix} 0 \\ 0 \end{bmatrix}, \begin{bmatrix} \sigma_z^2 & 0 \\ 0 & \sigma_z^2 \end{bmatrix}\right), \quad (17)$$

i.e., each of the x-component $w_{x,n}$ and the y-component $w_{y,n}$ of the noise vector $w_n$ is a zero-mean normal distribution with a standard deviation of $\sigma_z$.

Figure 14:
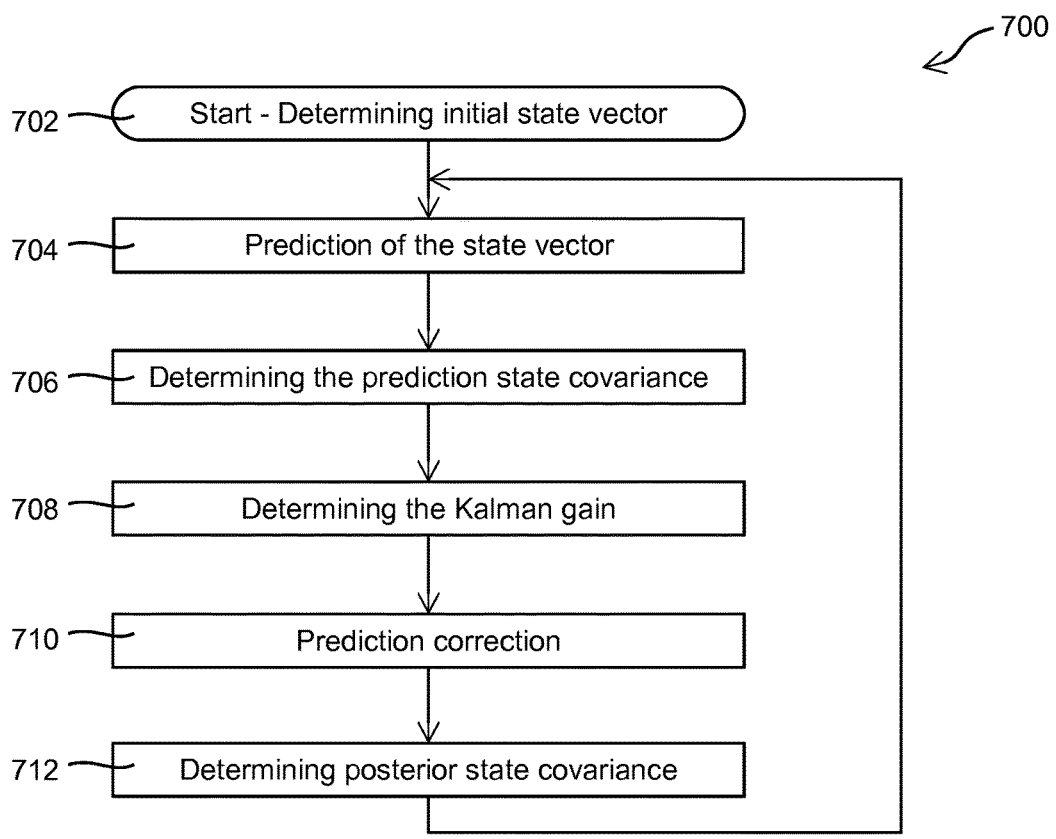
FIG. 14 is a flowchart showing the detail of mobile object tracking using an extended Kalman filter (EKF)

The EKF can then be started with the state transition function (7) and the observation function (15). FIG. 14 is a flowchart 700 showing the steps of mobile object tracking using EKF.

At step 702, to start the EKF, the initial state vector s(0|0) and the corresponding posteriori state covariance matrix, M(0|0), are determined. The initial state vector corresponds to the location of a mobile object before the imaging device captures any image. In this embodiment, if the location of a mobile object is unknown, its initial state vector is set to be at the center of the FOV of the imaging device with a zero velocity, and the corresponding posteriori state covariance matrix M(0|0) is set to a diagonal matrix with large values, which will force the EKF to disregard the initial information and base the first iteration entirely on the FFCs detected in the first captured image. On the other hand, if the location of a mobile object is unknown, e.g., via a RFID device at an entrance as described above, the initial state vector s(0|0) is set to the known location, and the corresponding posteriori state covariance matrix M(0|0) is set to a zero matrix (a matrix with all elements being zero).

At step 704, a prediction of the state vector is made:

$$s(n|n-1) = s(n-1|n-1). \quad (18)$$

At step 706, the prediction state covariance is determined:

$$M(n|n-1) = M(n-1|n-1) + Q_u \quad (19)$$

where $$Q_u = \begin{bmatrix} \sigma_u^2 & 0 \\ 0 & \sigma_u^2 \end{bmatrix}. \quad (20)$$

At step 708, the Kalman gain is determined:

$$K(n) = M(n|n-1)H(n)^T(H(n)M(n|n-1)H(n)^T + Q_w)^{-1} \quad (21)$$

where H(n) is the Jacobian matrix of h(s(n|n−1)), $$H(n) = \begin{bmatrix} \dfrac{\partial h_x(s(n|n-1))}{\partial x_{w,n}} & \dfrac{\partial h_x(s(n|n-1))}{\partial y_{w,n}} \\ \dfrac{\partial h_y(s(n|n-1))}{\partial x_{w,n}} & \dfrac{\partial h_y(s(n|n-1))}{\partial y_{w,n}} \end{bmatrix} \quad (22)$$

At step 710, prediction correction is conducted. The prediction error is determined based on difference between the predicted location and the BBTP location in the captured image:

$$\tilde{z}_n = \begin{bmatrix} z_{1,n} \\ z_{2,n} \end{bmatrix} - h(s(n|n-1)). \quad (23)$$

Then, the updated state estimate is given as:

$$s(n|n) = s(n|n-1) + K(n)\tilde{z}_n. \quad (24)$$

At step 712, the posterior state covariance is calculated as:

$$M(n|n) = (I - K(n)H(n))M(n|n-1), \quad (25)$$

with I representing an identity matrix.

An issue of using the random walk model is that mobile object tracking may fail when the object is occluded. For example, if a mobile object being tracked is occluded in the FOV of the imaging device, the EKF would receive no new observations from consequent images. The EKF tracking would then stop at the last predicted state, which is the state determined in the previous iteration, and the Kalman gain will go instantly to zero (0). The tracking thus stops.

This issue can be alleviated by choosing a different 2D model of pose being a random walk model and using the velocity magnitude (i.e., the speed) as an independent state variable. The speed will also be a random walk but with a tendency towards zero (0), i.e., if no observations are made related to speed then it will exponentially decay towards zero (0).

Now consider the EKF update when the object is suddenly occluded such that there are no new measurements. In this case speed state will slowly decay towards zero with settable decay parameter, but generally with high probability. When the object emerges from the occlusion, it would not be too far from the EKF tracking point such that, with the restored measurement quality, accurate tracking can resume. The velocity decay factor used in this model is heuristically set based on the nature of the moving objects in the FOV. For example, if the mobile objects being tracked are travelers moving in an airport gate area, the change in velocity of bored travelers milling around killing time will be higher and less predictable than people walking purposively down a long corridor. As each imaging device is facing an area with known characteristics, model parameters can be customized and refined according to the known characteristics of the area and past experience.

Those skilled in the art appreciate that the above EKF tracking is merely one example of implementing FFC tracking, and other tracking methods are readily available. Moreover, as FFC tracking is conducted in the computer cloud 108, the computational cost is generally of less concern, and other advanced tracking methods, such as Bayesian filters, can be used. If the initial location of a mobile object is accurately known, then a Gaussian kernel may be used. However, if a mobile object is likely in the FOV but its initial location of is unknown, a particle filter (PF) may be used, and once the object becomes more accurately tracked, the PF can be switched to an EKF for reducing computational complexity. When multiple mobile objects are continuously tracked, computational resources can be better allocated by dynamically switching object tracking between PF and EKF, i.e., using EKF to track the mobile objects that have been tracked with higher accuracy, and using PF to track the mobile objects not yet being tracked, or being tracked but with low accuracy.

A limitation of the EKF as established earlier is that the site map is not easily accounted for. Neither are the inferences which are only very roughly approximated as Gaussian as required for the EKF.

In an alternative embodiment, non-parametric Bayesian processing is used for FFC tracking by leveraging the knowledge of the site.

In this embodiment, the location of a mobile object in room 742 is represented by a two dimensional probability density function (pdf) $p_{x,y}$. If the area in the FOV of an imaging device is finite with plausible boundaries, the area is discretized into a grid, and each grid point is considered to be a possible location for mobile objects. The frame rates of the imaging devices are sufficiently high such that, from one captured image to the next, a mobile object would appear therein either stay at the same grid point or move from a grid point to an adjacent grid point.

Figure 15A:
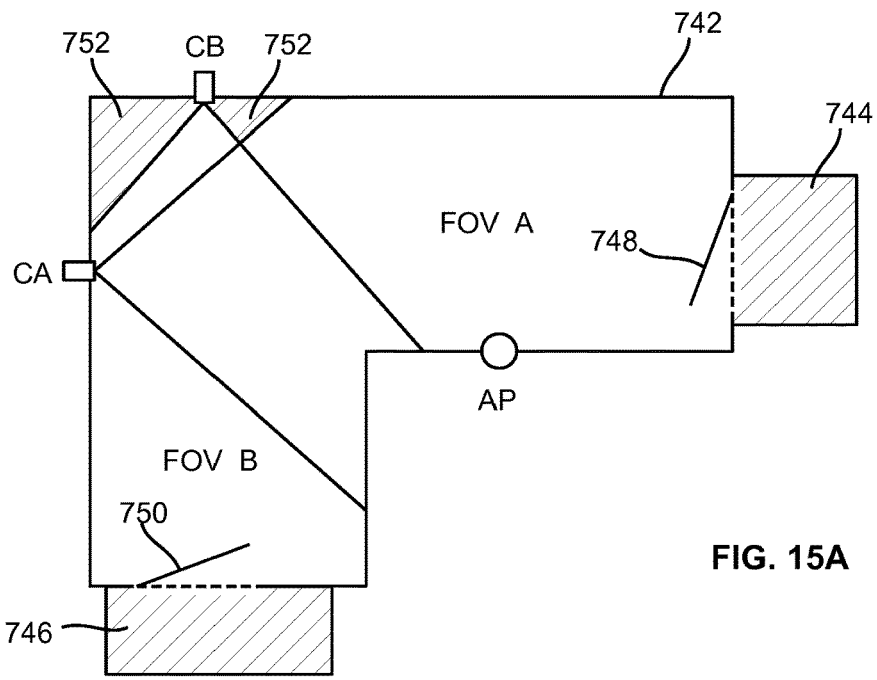
FIG. 15A shows an example of two imaging devices CA and CB with overlapping field of view (FOV) covering an L-shaped room.

FIG. 15A shows an example of two imaging devices CA and CB with overlapping FOVs covering an L-shaped room 742. As shown, the room 742 is connected to rooms 744 and 746 via doors 748 and 750, respectively. Rooms 744 and 746 are uncovered by imaging devices CA and CB. Moreover, there exist areas 752 uncovered by both CA and CB. An access point (AP) is installed in this room 742 for sensing tag devices using RSS measurement.

When a mobile object having a tag device enters room 742, the RSS measurement indicates that a tag device/mobile object is in the room. However, before processing any captured images, the location of the mobile device is unknown.

Figure 15B:
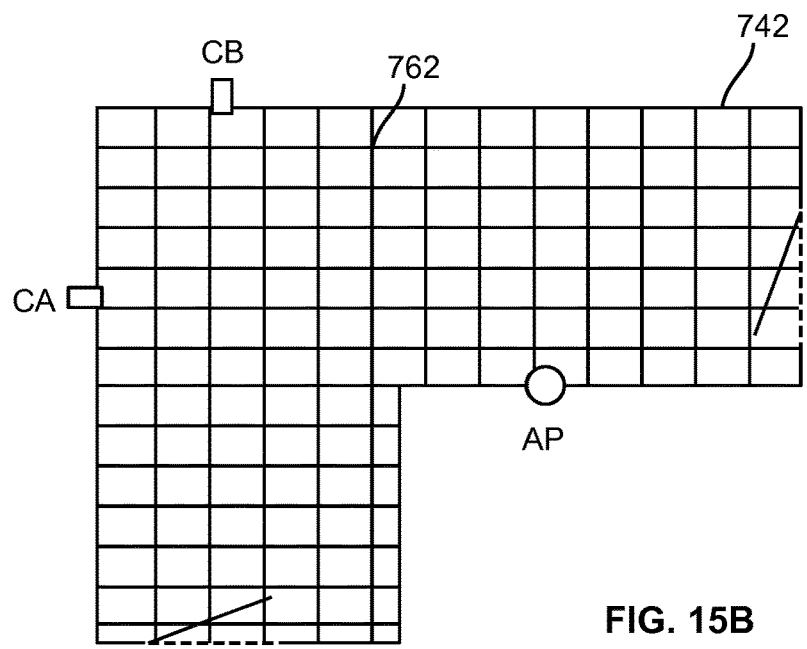
FIG. 15B shows a grid partitioning of the room of FIG. 15A.

As shown in FIG. 15B, the area of the room 742 is discretized into a grid having a plurality of grid points 762, each representing a possible location for mobile objects. In this embodiment, the distance between two adjacent grid points 762 along the x- or y-axis is a constant. In other words, each grid point may be expressed as: (i∆x, j∆y) with ∆x and ∆y being constants and i and j being integers. ∆x and ∆y are design parameters that depend on the application and implementation.

Figure 16A:
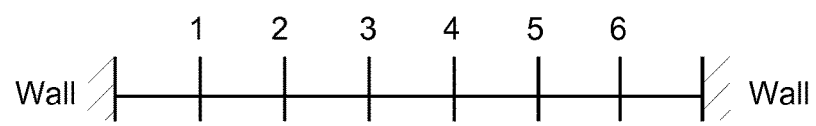
FIG. 16A shows an imaginary, one-dimensional room partitioned to six grid points.
Figure 16B:
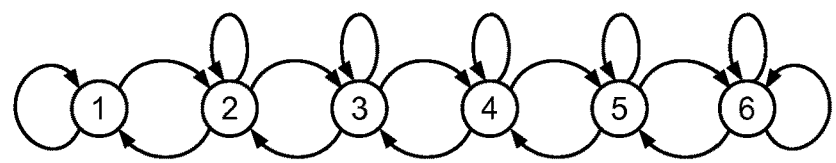
FIG. 16B is a state diagram for the imaginary room of FIG. 16A.

The computer vision processing block 146 also builds a state diagram of the grid points described the transition of a mobile object from one grid point to another. The state diagram of the grid points is generally a connected graph whose properties change with observations made from the imaging device and the tag device. A state diagram for room 742 would be too complicated to show herein. For ease of illustration, FIG. 16A shows an imaginary, one-dimensional room partitioned to 6 grid points, and FIG. 16B shows the state diagram for the imaginary room of FIG. 16A. In this example, the walls are considered reflective, i.e., a mobile object in grid point 1 can only choose to stay therein or move to grid point 2, and a mobile object in grid point 6 can only choose to stay therein or move to grid point 5.

Referring back to FIGS. 15A and 15B, as the room 742 is discretized into a plurality of grid points 762, the computer vision processing block 146 associates a belief probability with each grid point as the possibility that the mobile object to be tracked is at that point. The computer vision processing block 146 then considers that the motion of mobile objects follows a first order Markov model, and uses a Minimum Mean Square Error (MMSE) location estimate method to track the mobile object.

Let $p_{i,j}^t$ denote the location probability density function (pdf) or probability mass function (pmf) that the mobile object is at the location (i∆x, j∆y) at the time step t. Initially, if the location of the mobile object is unknown, the location pdf $p_{i,j}^t$ is set to be uniform over all grid points, i.e., $$p_{i,j}^0 = \frac{1}{XY}, \text{ for } i = 1, ..., X, \text{ and } j = 1, ..., Y \tag{26}$$

where X is the number of grid points along the x-axis and Y is the number of grid points along the y-axis.

Based on the Markov model, $p_{i,j}^t$ is only dependent on the previous probability $p_{i,j}^{t-1}$, the current update and the current BBTP position $z^t$, $p_{i,j}^t$ may be computed using a numerical procedure. The minimum variance estimate of the mobile object location is then based on the mean of this pdf.

From one time step to the next, the mobile object may stay at the same grid point or move to one of the adjacent grid points, each of which is associated with a transition probability. Therefore, the expected (i.e., not yet compared with any observations) transition of the mobile object from time step t to time step t+1, or equivalently, from time step t−1 to time step t, may be described by a transition matrix consisting of these transition probabilities:

$$p_u^t = Tp^{t-1}, \tag{27}$$

where $p_u^t$ is a vector consisting of expected location pdfs at time step t, $p^{t-1}$ is a vector consisting of the location pdfs $p_{i,j}^t$ at time step t−1, and T is the state transition matrix.

Matrix T describes the probabilities that mobile object transiting from one grid point to another. Matrix T describes boundary conditions, including reflecting boundaries and absorbing boundaries. A reflecting boundary such as a wall means that a mobile object has to turn back when approaching the boundary. An absorbing boundary such as a door means that a mobile object can pass therethrough, and the probability of being in the area diminishes accordingly.

When an image of the area 742 is captured and a BBTP is determined therein, the location of the BBTP is mapped via perspective mapping to the 3D physical world coordinate system of the area 742 as an observation. Such an observation may be inaccurate, and its pdf, denoted as $p_{BBTP,i,j}^t$, may be modelled as a 2D Gaussian distribution.

Therefore, the location pdfs $p_{i,j}^t$, or the matrix $p^t$ thereof, at time step t may be updated from that at time step t−1 and the BBTP observation as:

$$p_t = \eta p_{BBTP}^t T p_u^{t-1}, \qquad (28)$$

where $p_{BBTP}^t$ is a vector of $p_{BBTP,i,j}^t$ at time step t, and $\eta$ is a scaler to ensure the updated location pdf $p_{i,j}^t$ can be added to one (1).

Equation (28) calculates the posterior location probability pdf $p^t$ based on the BBTP data obtained from the imaging device. The peak or maximum of the updated pdf $p_{i,j}^t$, or $p^t$ in matrix form, indicates the most likely location of the mobile object. In other words, if the maximum of the updated pdf $p_{i,j}^t$ is at $i=i_k$ and $j=j_k$, the mobile object is most likely at the grid point $(i_k\Delta x, j_k\Delta y)$. With more images being captured, the mobile location pdf $p_{i,j}^t$ is further updated using equation (28) to obtain updated estimate of the mobile object location.

With this method, if the BBTP is of high certainty then the posterior location probability pdf $p^t$ quickly becomes a delta function, giving rise to high certainty of the location of the mobile object.

For example, if a mobile object at $(i\Delta x, j\Delta y)$ is static from time step t=1 to time step t=k, then equation (28) becomes $$p_{i,j}^t = \eta \prod_{t=1}^{k} p_{BBTP,i,j}^t p_{i,j}^0, \qquad (29)$$

which becomes a "narrow spike" with the peak at (i,j) after several iterations, and the variance of the MMSE estimate of the object location diminishes.

Figure 17A:
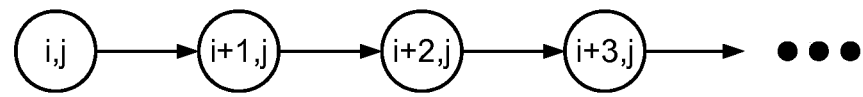
Figure 17B:
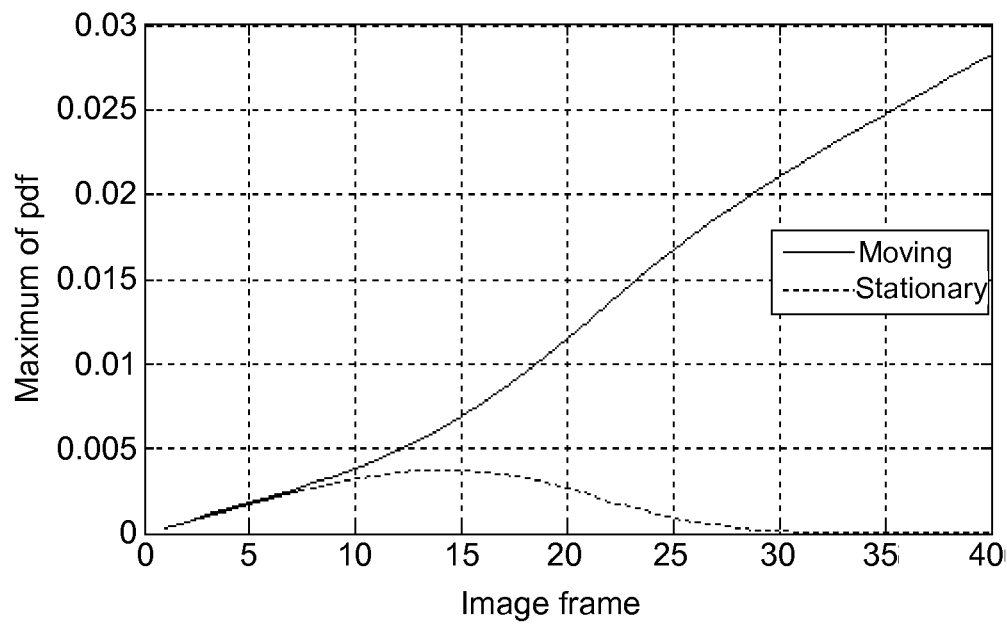

FIGS. 17A and 17B show a deterministic example, where a mobile object is moving to the right hand side along the x-axis in the FOV of an imaging device. FIG. 17A is the state transition diagram, showing that the mobile object is moving to the right with probability of one (1). The computer vision processing block 146 tests the first assumption that the mobile object is stationary and the second assumption that the mobile object is moving, by using a set of consecutively captured image frames and equation (28). The test results are show in FIG. 17B. As can be seen, while at first several image frames or iterations, both assumptions show similar likelihood, the assumption of a stationary object quickly diminishes to zero probability but the assumption of a moving object grows to a much higher probability. Thus, the computer vision processing block 146 can decide that the object is moving, and may request candidate tag devices to provide IMU measurements for establishing FFC-tag association.

Figure 18A:
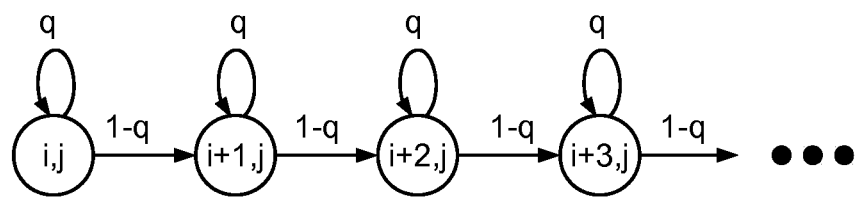

FIGS. 18A to 18E show another example, where a mobile object is slewing, i.e., moving with uncertainty, to the right hand side along the x-axis in the FOV of an imaging device. FIG. 18A is the state transition diagram, showing that, in each transition from one image to another, the mobile object may stay at the same grid point with a probability of q, and may move to the adjacent grid point on the right hand side with a probability of (1−q). Hence the average slew velocity is:

$$v_{avg} = (1-q)\frac{\Delta x}{\Delta t}. \qquad (30)$$

Figure 18B:
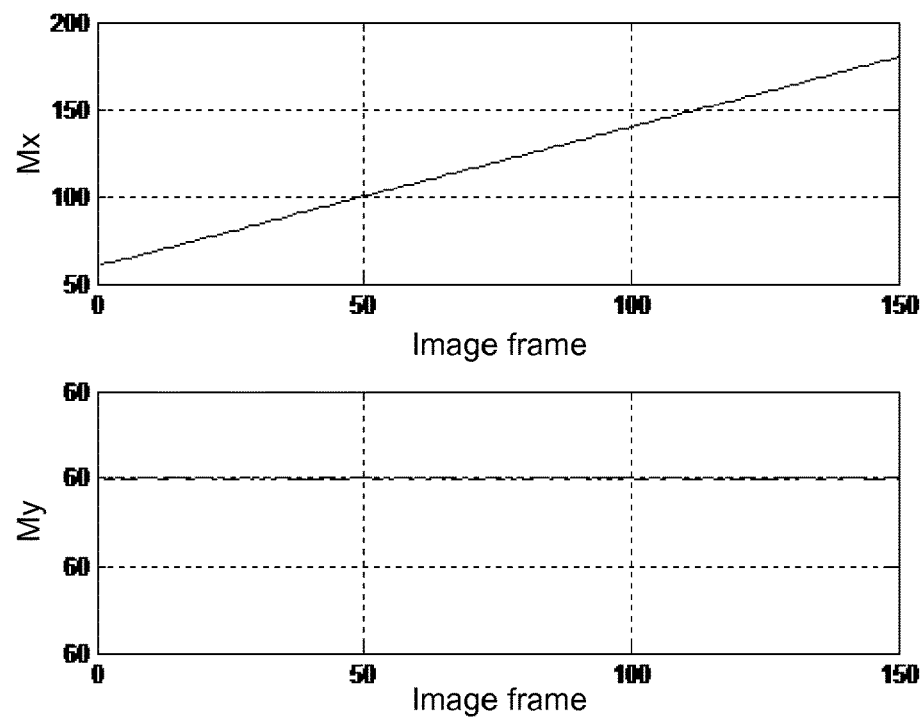
Figure 18C:
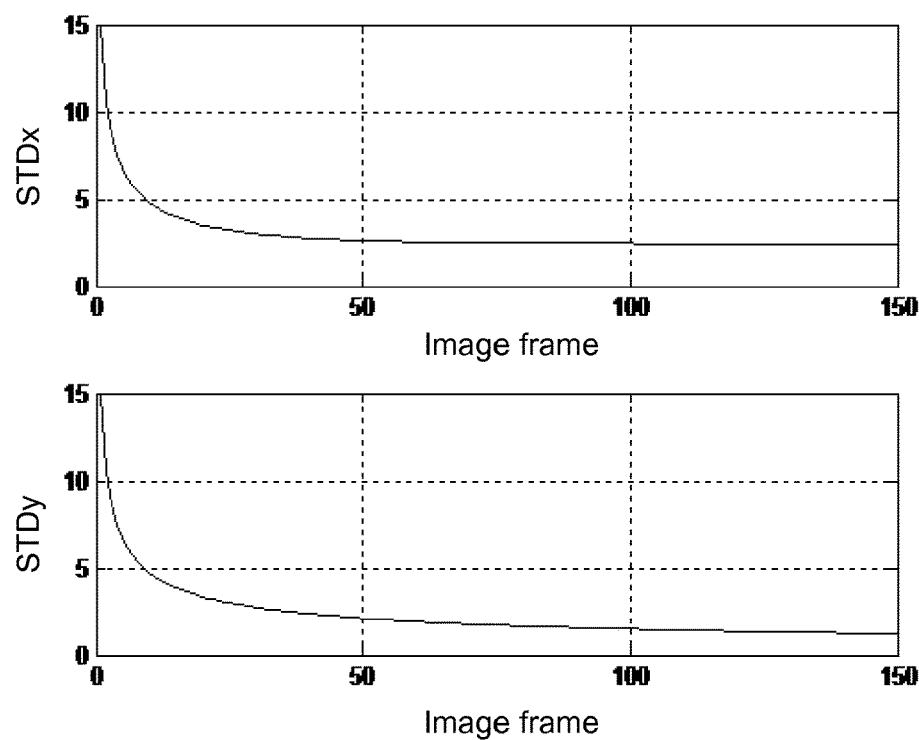

FIGS. 18B and 18C show the tracking results using equation (28) with q=0.2. FIG. 18B shows the mean of x- and y-coordinates of the mobile object, which accurately tracked the movement of the mobile object. FIG. 18C shows the standard deviation (STD) of x- and y-coordinates of the mobile object, denoted as STDx and STDy. As can be seen, both STDx and STDy start with a high value (because the initial location pdf is uniformly distributed). STDy quickly reduced to about zero (0) because, in this example, no uncertainty exists along the y-axis during mobile object tracking. STDx quickly reduced from a large initial value to a steady state with a low but non-zero probability due to the non-zero probability q.

Other grid based tracking methods are also readily available. For example, instead of using a Gaussian model for the BBTP, a different model designed with consideration of the characteristics of the site, such as its geometry, lighting and the like, and the FOV of the imaging device may be used to provide accurate mobile object tracking.

In above embodiment, the position (x, y) of the mobile object is used as the state variables. In an alternative embodiment, the position (x, y) and the velocity $(v_x, v_y)$ of the mobile object are used as the state variables. In yet another embodiment, speed and pose may be used as state variables.

Figure 19:
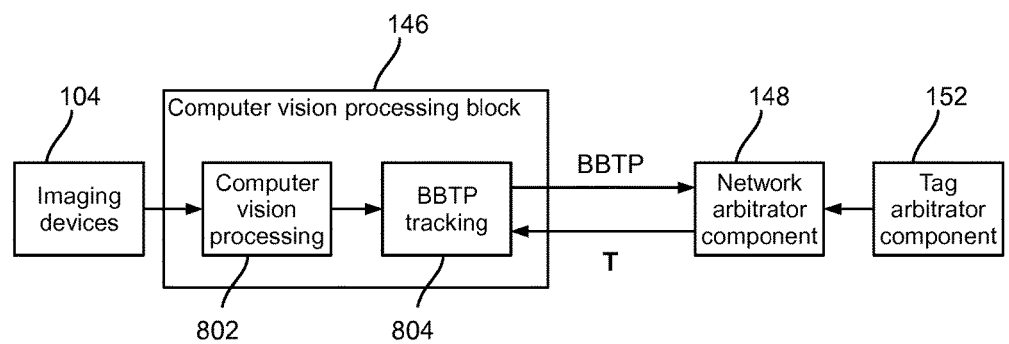
FIG. 19 is a schematic diagram showing the data flow for determining a state transition matrix.

In above embodiments, the state transition matrix T is determined without assistance of any tag devices. In an alternative embodiment, the network arbitrator component 148 requests tag devices to provide necessary tag measurement for assistance in determining the state transition matrix T. FIG. 19 is a schematic diagram showing the data flow for determining the state transition matrix T. The computer vision processing block uses computer vision technology to process (block 802) images captured from imaging devices 104, and tracks (block 804) FFC using above described BBTP based tracking. The BBTPs are sent to the network arbitrator component 148, and the network arbitrator component 148 accordingly requests tag arbitrator components 146 to provide necessary tag measurements. A state transition matrix T is then generated based on obtained tag measurements, and is sent to the computer vision processing block 146 for mobile object tracking.

The above described mobile object tracking using a first order Markov model and grid discretization is robust and computationally efficient. Ambiguity caused by object merging/occlusion may be resolved using a prediction-observation method (described later). Latency in mobile object tracking (e.g., due to the computational load) is relatively small (e.g., several seconds), and is generally acceptable.

The computer vision processing structure 146 provides information regarding the FFCs observed and extracts attributes thereof, including observables such as the bounding box around the FFC, color histogram, intensity, variations from one image frame to another, feature points within the FFC, associations of adjacent FFCs that are in a cluster and hence are part of the same mobile object, optical flow of the FFC and velocities of the feature points, undulations of the overall bounding box and the like. The observables of the FFCs are stored for facilitating, if needed, the comparison with tag measurements.

For example, the computer vision processing structure 146 can provide a measurement of activity of the bounding box of an FFC, which is used to compare with similar activity measurement obtained the tag device 114. After normalization a comparison is made resulting in a numerical value for the likelihood indicating whether the activity observed by the computer vision processing structure 146 and tag device 114 are the same. Generally a Gaussian weighting is applied based on parameters that are determined experimentally. As another example, the position of the mobile object corresponding to an FFC in the site, as determined via the perspective mapping or transformation from the captured image, and the MMSE estimate of the mobile object position can be correlated with observables obtained from the tag device 114. For instance, the velocity observed from the change in the position of a person indicates walking, and the tag device reveals a gesture of walking based on IMU outputs. However, such as gesture may be weak if the tag device is attached to the mobile object in such a manner that the gait is weakly detected, or may be strong if the tag device is located in the foot of the person. Fuzzy membership functions can be devised to represent the gesture. This fuzzy output can be compared to the computer vision analysis result to determine the degree of agreement or correlation of the walking activity. In some embodiments, methods based on fuzzy logic may be used for assisting mobile object tracking.

In another example, the computer vision processing structure 146 determines that the bounding box of an FFC has become stationary and then shrunk to half the size. The barometer of a tag device reveals a step change in short term averaged air pressure commensurate with an altitude change of about two feet. Hence the tag measurement from the tag device's barometer would register a sit down gesture of the mobile object. However, due to noise and barometer drift as well as spurious changes in room air pressure the gesture is probabilistic. The system thus correlates the tag measurement and computer vision analysis result, and calculates a probability representing the degree of certainty that the tag measurement and computer vision analysis result match regarding the sitting activity.

With above examples, those skilled in the art appreciate that, the system determines a degree of certainty of a gesture or activity based on the correlation between the computer vision (i.e., analysis of captured images) and the tag device (i.e., tag measurements). The set of such correlative activities or gestures are then combined and weighted for calculating the certainty, represented by a probability number, that the FFC may be associated with the tag device.

Object Merging and Occlusion

Occlusion may occur between mobile objects, and between a mobile object and a background object. Closely positioned mobile objects may be detected as a single FFC.

Figure 20A:
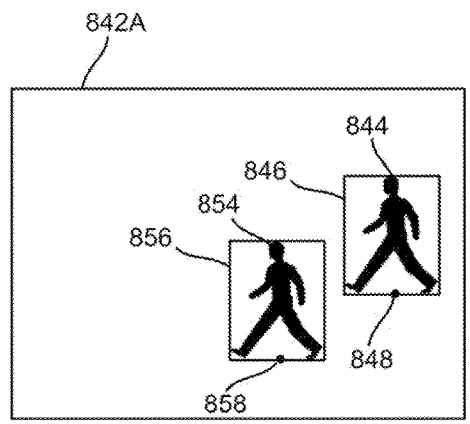
FIGS. 20A to 20E show visual representation of an example of merging/occlusion of two mobile objects.

FIGS. 20A to 20E show an example of merging/occlusion of two mobile objects 844 and 854. As shown in FIG. 20A, the two mobile objects 844 and 854 are sufficiently apart and they show in a captured image 842A as separate FFCs 844 and 854, having their own bounding box 846 and 856 and BBTPs 848 and 858, respectively.

Figure 20B:
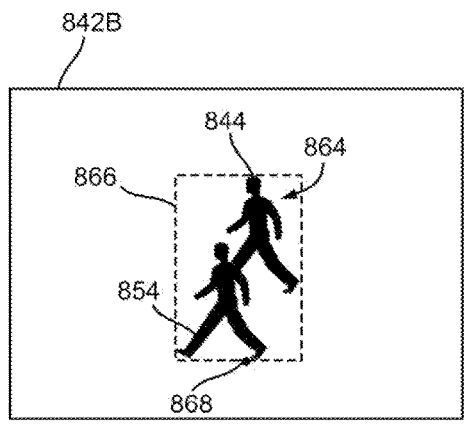
Figure 20C:
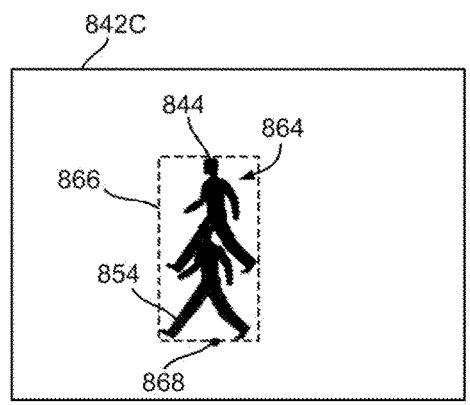
Figure 20D:
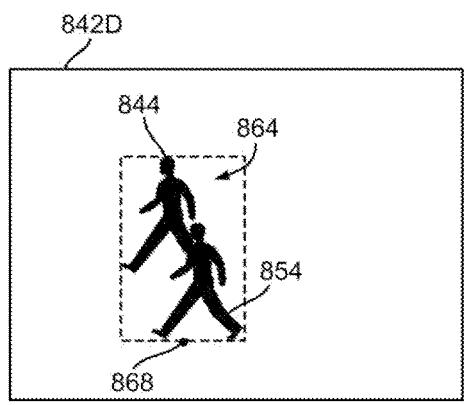

As shown in FIGS. 20B to 20D, when mobile objects 844 and 854 are moving close to each other, they are detected as a single FFC 864 with a bounding box 866 and a BBTP 868. The size of the single FFC 854 may vary depending the occlusion between the two mobile objects and/or the distance therebetween. Ambiguity may occur as it may appear that the two previously detected mobile objects 844 and 854 disappear with a new mobile object 864 appearing at the same location.

Figure 20E:
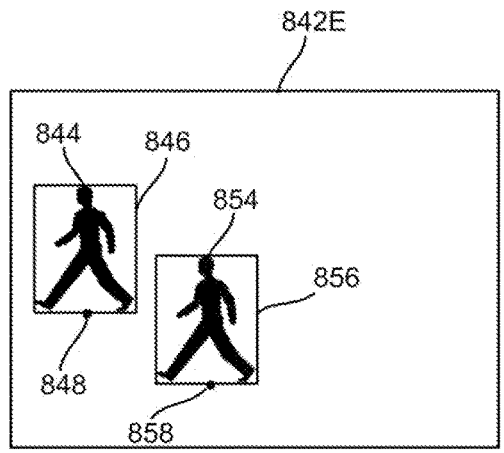

As shown in FIG. 20E, when the two mobile objects have moved apart with sufficient distance, two FFCs are again detected. Ambiguity may occur as it may appear that the previously detected mobile object 864 disappears with two new mobile objects 844 and 854 appearing at the same location.

FIGS. 21A to 21E show an example that a mobile object is occluded by a background object.

Figure 21A:
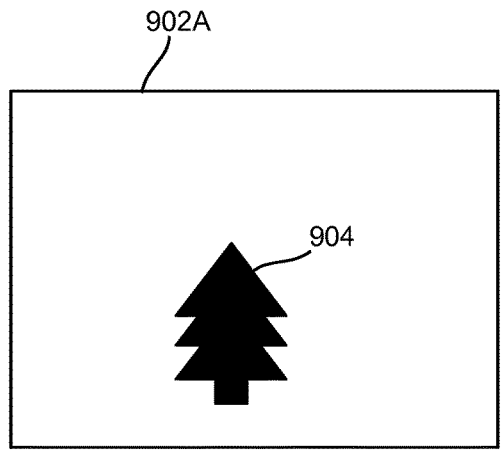
FIGS. 21A to 21E show visual representation of an example that a mobile object is occluded by a background object.

FIG. 21A shows a background image 902A having a tree 904 therein as a background object.

Figure 21B:
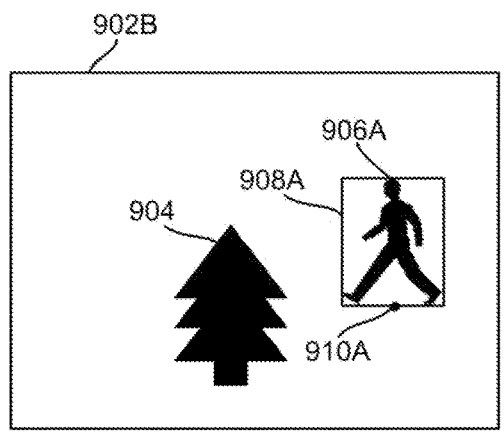
Figure 21C:
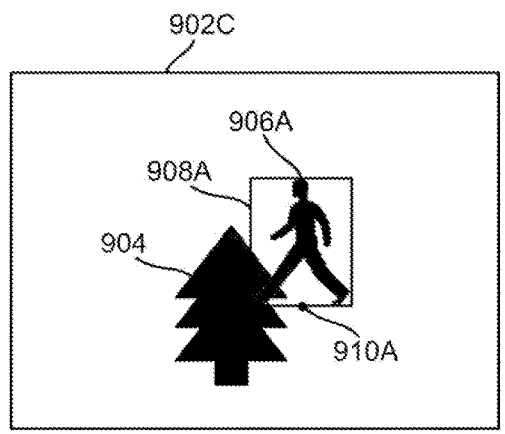

A mobile object 906A is moving towards the background object 904, and passes the background object 904 from behind. As shown in FIG. 21B, in the captured image 902B, the mobile object 906A is not yet occluded by the background object 904, and the entire image of mobile object 906 is detected as an FFC 906A with a bounding box 908A and a BBTP 910A. In FIG. 21C, the mobile object 906A is slightly occluded by the background object 904 and the FFC 906A, bounding box 908A and BBTP 910A are essentially the same as those detected in the image 902B (except position difference).

Figure 21D:
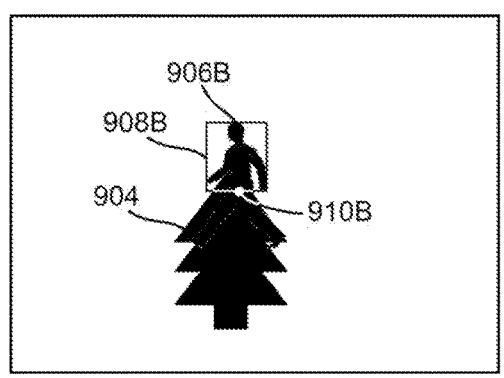

In FIG. 21D, the mobile object is significantly occluded by the background object 904. The detected FFC 906B is now significantly smaller that the FFC 906A in images 902B and 902C. Moreover, the BBTP 910B is at a much higher position than 910A in images 902B and 902C. Ambiguity may occur as it may appear that the previously detected mobile object 906A disappears and a new mobile object 906B appears at the same location.

Figure 21E:
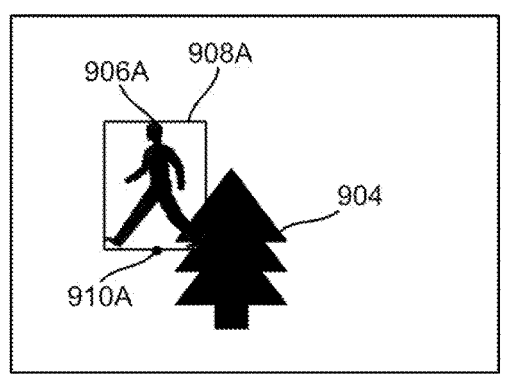

As shown in FIG. 21E, when the mobile object 906A walks out of the occlusion of the background object 904, a "full" FFC 906A much larger than FFC 906B is detected. Ambiguity may occur as it may appear that the previously detected mobile object 906B disappears and a new mobile object 906A appears at the same location.

As described before, the frame rate of the imaging device is sufficiently high, and the mobile object movement is therefore reasonably smooth. Then, ambiguity caused by object merging/occlusion can be resolved by a prediction-observation method, i.e., predicting the action of the mobile object and comparing the prediction with observation obtained from captured images and/or tag devices.

For example, the mobile object velocity and/or trajectory may be used as random state variables, and above described tracking methods may be used for prediction. For example, the system may predict the locations and time instants that a mobile object may appear during a selected period of future time, and monitor the FFCs during the selected period of time. If the FFCs appear to largely match the prediction, e.g., the observed velocity and/or trajectory highly correlated with the prediction (e.g., their correlation higher than a predefined or dynamically set threshold), then the FFCs are associated with the same tag device even if in some moments/images abnormity of FFC occurred, such as size of the FFC significantly changed, BBTP significantly moved off the trajectory, FFC disappeared or appeared, and the like.

If the ambiguity cannot be resolved solely from captured images, tag measurements may be requested to obtain further observation to resolve the ambiguity.

In an alternative embodiment, the system 100 also comprises a map of magnetometer abnormalities (magnetometer abnormality map). The system may request tag devices having magnetometers to provide magnetic measurements and compare with the magnetometer abnormality map for tracking resolving ambiguity occurred during mobile object tracking.

In above embodiments, tag devices 114 comprise sensors for collecting tag measurements, and tag devices 114 transmit tag measurements to the computer cloud 108. In some alternative embodiments, at least some tag devices 114 may comprise a component broadcasting, continuously or intermittently, a detectable signal. Also, one or more sensors for detecting such detectable signal are deployed in the site. The one or more sensors detect the detectable signal and obtain measurements of one or more characteristics of the tag device 114, and transit the obtained measurements to the computer cloud 108 for establishing FFC-tag association and resolving ambiguity. For example, in one embodiment, each tag device 114 may comprise an RFID transmitter transmitting an RFID identity, and one or more RFID readers are deployed in the site 102, e.g., at one or more entrances, for detecting the RFID identity of the tag devices in proximity therewith. As another example, each tag device 114 may broadcast a BLE beacon. One or more BLE access points may be deployed in the site 102, detecting the BLE beacon of a tag device, and determine an estimated location using RSS. The estimated location, although inaccurate, may be transmitted to the computer cloud for establishing FFC-tag association and resolving ambiguity.

As those skilled in the art appreciate, the processes and methods described above may be implemented as computer executable code, in the forms of software applications and modules, firmware modules and the combination thereof, which may be stored in one or more non-transitory, computer readable storage devices or media such as hard drives, solid state drives, floppy drives, Compact Disc Read-Only Memory (CD-ROM) discs, DVD-ROM discs, Blu-ray discs, Flash drives, Read-Only Memory chips such as erasable programmable read-only memory (EPROM), and the like.

Although embodiments have been described above with reference to the accompanying drawings, those of skill in the art will appreciate that variations and modifications may be made without departing from the scope thereof as defined by the appended claims.

What is claimed is:

1. A system for tracking at least one mobile object in a site, the system comprising:
    one or more imaging devices for capturing images of at least a portion of the site;
    one or more tag devices, each of the one or more tag devices being configured for association with one of the at least one mobile object and moveable therewith, each of the one or more tag devices having one or more sensors for obtaining one or more tag measurements related to the mobile object associated therewith; and
    at least one processing structure configured for combining the captured images with at least one of the one or more tag measurements for tracking the at least one mobile object;
    wherein said combining the captured images with the at least one of the one or more tag measurements for tracking the at least one mobile object comprises:
        identifying, from the captured images, one or more foreground feature clusters (FFCs) for tracking the at least one mobile object, and determining a bounding box and a tracking point therefor, said tracking point being at a bottom edge of the bounding box.

2. The system of claim 1 wherein said one or more sensors comprising at least one of an Inertial Measurement Unit (IMU), a barometer, a thermometer, a magnetometer, a global navigation satellite system (GNSS) sensor, an audio frequency microphone, a light sensor, a camera, and a receiver signal strength (RSS) measurement sensor.

3. The system of claim 1 wherein the at least one processing structure is configured for analyzing images captured by the one or more imaging devices for determining a set of candidate tag devices for providing said at least one of the one or more tag measurements.

4. The system of claim 3 wherein the at least one processing structure is configured for analyzing images captured by the one or more imaging devices for selecting said at least one of the one or more tag measurements.

5. The system of claim 1 wherein each of the tag devices is configured for providing the at least one of the one or more tag measurements to the at least one processing structure only when said tag device receives from the at least one processing structure a request for providing the at least one of the one or more tag measurements.

6. The system of claim 1 wherein the at least one processing structure is configured for associating each tag device with one of the FFCs.

7. The system of claim 6 wherein, when associating a tag device with a FFC, the at least one processing structure is configured for calculating an FFC-tag association probability indicating the reliability of the association between the tag device and the FFC.

8. The system of claim 7 wherein said FFC-tag association probability is calculated based on a set of consecutively captured images.

9. The system of claim 1 wherein, after detecting the one or more FFCs, the at least one processing structure is configured for determining the location of each of the one or more FFCs in the captured image, and maps each of the one or more FFCs to a three-dimensional (3D) coordinate system of the site by using perspective mapping.

10. The system of claim 1 wherein each FFC corresponds to a mobile object, and wherein the at least one processing structure is configured for tracking the FFCs using a first order Markov process.

11. The system of claim 1 wherein the at least one processing structure is configured for tracking the FFCs using a Kalman filter with a first order Markov Gaussian process.

12. The system of claim 1 wherein, when tracking each of the FFCs, the at least one processing structure is configured for using the coordinates of the corresponding mobile object in a 3D coordinate system of the site as state variables, and the coordinates of the FFC in a two dimensional (2D) coordinate system of the captured images as observations for the state variables, and wherein the at least one processing structure is configured for mapping the coordinates of the corresponding mobile object in a 3D coordinate system of the site to the 2D coordinate system of the captured images.

13. The system of claim 1 wherein the at least one processing structure is configured for discretizing at least a portion of the site into a plurality of grid points, and wherein, when tracking a mobile object in said discretized portion of the site, the at least one processing structure is configured for using said grid points for approximating the location of the mobile object.

14. The system of claim 13 wherein, when tracking a mobile object in said discretized portion of the site, the at least one processing structure is configured for calculating a posterior position probability of the mobile object.

15. A method of tracking at least one mobile object in at least one visual field of view, comprising:
   capturing at least one image of the at least one visual field of view;
   identifying at least one candidate mobile object in the at least one image;
   obtaining one or more tag measurements from at least one tag device, each of said at least one tag device being associated with a mobile object and moveable therewith; and
   tracking at least one mobile object using the at least one image and the one or more tag measurements;
   wherein said identifying the at least one candidate mobile object in the at least one images comprises:
      identifying, from the at least one image, one or more foreground feature clusters (FFCs) for tracking the at least one mobile object, and determining a bounding box and a tracking point therefor, said tracking point being at a bottom edge of the bounding box.

16. The method of claim 15 further comprising:
analyzing the at least one image for determining a set of candidate tag devices for providing said one or more tag measurements.

17. The method of claim 15 further comprising:
analyzing the at least one image for selecting said at least one of the one or more tag measurements.

18. The method of claim 15 further comprising:
associating each tag device with one of the FFCs.

19. The method of claim 18 further comprising:
calculating an FFC-tag association probability indicating the reliability of the association between the tag device and the FFC.

20. The method of claim 15 further comprising:
tracking the FFCs using a first order Markov process.

21. The method of claim 15 further comprising:
discretizing at least a portion of the site into a plurality of grid points; and
tracking a mobile object in said discretized portion of the site by using said grid points for approximating the location of the mobile object.

22. A non-transitory, computer readable storage device comprising computer-executable instructions for tracking at least one mobile object in a site, wherein the instructions, when executed, cause one or more processing structures to perform actions comprising:
   capturing at least one image of the at least one visual field of view;
   identifying at least one candidate mobile object in the at least one image;
   obtaining one or more tag measurements from at least one tag device, each of said at least one tag device being associated with a mobile object and moveable therewith; and
   tracking at least one mobile object using the at least one image and the one or more tag measurements;
   wherein said identifying the at least one candidate mobile object in the at least one image comprising:
      identifying, from the at least one image, one or more foreground feature clusters (FFCs) for tracking the at least one mobile object, and determines a bounding box and a tracking point therefor, said tracking point being at a bottom edge of the bounding box.

23. The storage device of claim 22 further comprising computer-executable instructions, when executed, causing the one or more processing structures to perform actions comprising:
   calculating an FFC-tag association probability indicating the reliability of the association between the tag device and the FFC.

24. The storage device of claim 22 further comprising computer-executable instructions, when executed, causing the one or more processing structures to perform actions comprising:
   analyzing the at least one image for selecting said at least one of the one or more tag measurements.

25. The storage device of claim 22 further comprising computer-executable instructions, when executed, causing the one or more processing structures to perform actions comprising:
   associating each tag device with one of the FFCs.

26. The storage device of claim 25 further comprising computer-executable instructions, when executed, causing the one or more processing structures to perform actions comprising:
   calculating an FFC-tag association probability indicating the reliability of the association between the tag device and the FFC.

27. The storage device of claim 22 further comprising computer-executable instructions, when executed, causing the one or more processing structures to perform actions comprising:
   discretizing at least a portion of the site into a plurality of grid points; and
   tracking a mobile object in said discretized portion of the site by using said grid points for approximating the location of the mobile object.

28. The storage device of claim 22 further comprising computer-executable instructions, when executed, causing the one or more processing structures to perform actions comprising:
   analyzing the at least one image for determining a set of candidate tag devices for providing said one or more tag measurements.

29. The storage device of claim 22 further comprising computer-executable instructions, when executed, causing the one or more processing structures to perform actions comprising:
   tracking the FFCs using a first order Markov process.

30. The storage device of claim 22 further comprising computer-executable instructions, when executed, causing the one or more processing structures to perform actions comprising:
   tracking the FFCs using a Kalman filter with a first order Markov Gaussian process.

* * * * *